(12) United States Patent
Klug et al.

(10) Patent No.: US 6,407,833 B2
(45) Date of Patent: Jun. 18, 2002

(54) SYSTEM AND METHOD FOR PRODUCING AND DISPLAYING A ONE-STEP, EDGE-LIT HOLOGRAM

(75) Inventors: Michael Anthony Klug; Mark E. Holzbach, both of Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/746,609

(22) Filed: Dec. 20, 2000

Related U.S. Application Data

(62) Division of application No. 09/504,730, filed on Feb. 16, 2000.
(60) Provisional application No. 60/120,433, filed on Feb. 16, 1999.

(51) Int. Cl.[7] .............................. G03H 1/22; G03H 1/26; G03H 1/00; G02B 5/32
(52) U.S. Cl. .............................. 359/32; 359/15; 359/22; 359/31; 359/1
(58) Field of Search ................................ 359/1, 22, 23, 359/24, 14, 15, 30, 31, 32, 33

(56) References Cited

U.S. PATENT DOCUMENTS

| | | | | |
|---|---|---|---|---|
| 4,795,223 A | * | 1/1989 | Moss | 359/32 |
| 4,830,445 A | * | 5/1989 | Robinson et al. | 359/32 |
| 5,121,229 A | * | 6/1992 | Benton et al. | 359/32 |
| 5,151,800 A | * | 9/1992 | Upatnieks | 359/30 |
| 5,710,646 A | * | 1/1998 | Kimura et al. | 359/14 |

\* cited by examiner

*Primary Examiner*—Audrey Chang
(74) *Attorney, Agent, or Firm*—Skjerven Morrill LLP

(57) ABSTRACT

A system and method are disclosed for producing and displaying a one-step, edge-lit hologram. For production, an object beam and an edge-lit reference beam are directed at holographic recording material and to interfere with one another. The holographic recording material and the object beam and edge-lit reference beam are then translated with respect to one another. The translation successively exposes multiple portions of the holographic recording material to the interference of the object beam and the edge-lit reference beam to record an edge-lit hologram on the holographic recording material. In one embodiment, the holographic recording material is moved while the object beam and the edge-lit reference beam remain generally stationary. In another embodiment, the object beam and the edge-lit reference beam move in unison with each other while the holographic recording material remains generally stationary. A base enclosure is preferably formed to removably receive an edge of a plinth having an edge-lit hologram mounted thereon. A light source may be positioned within the base enclosure to provide an illumination beam to reconstruct the edge-lit hologram when the plinth is received by the base enclosure.

3 Claims, 16 Drawing Sheets

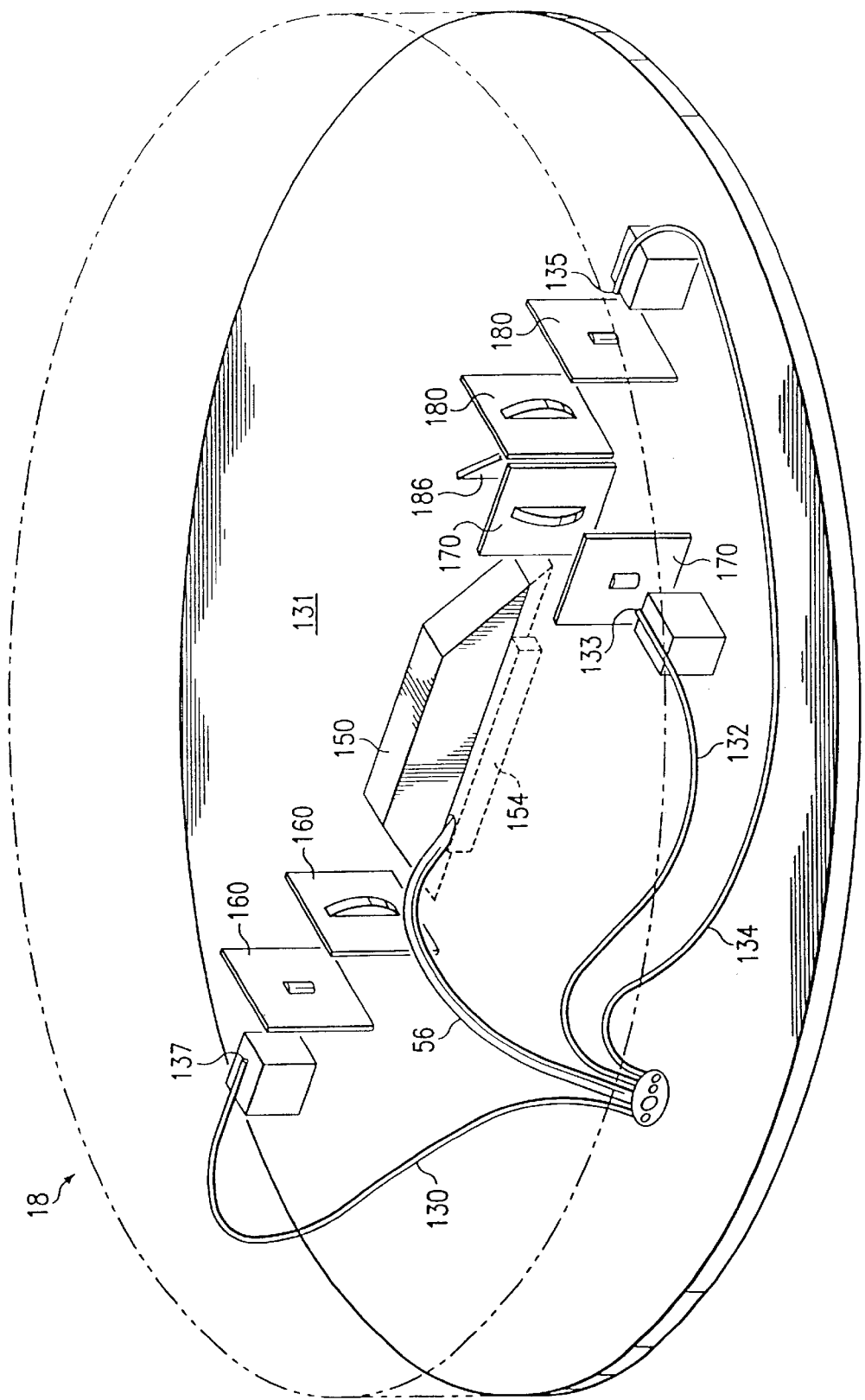

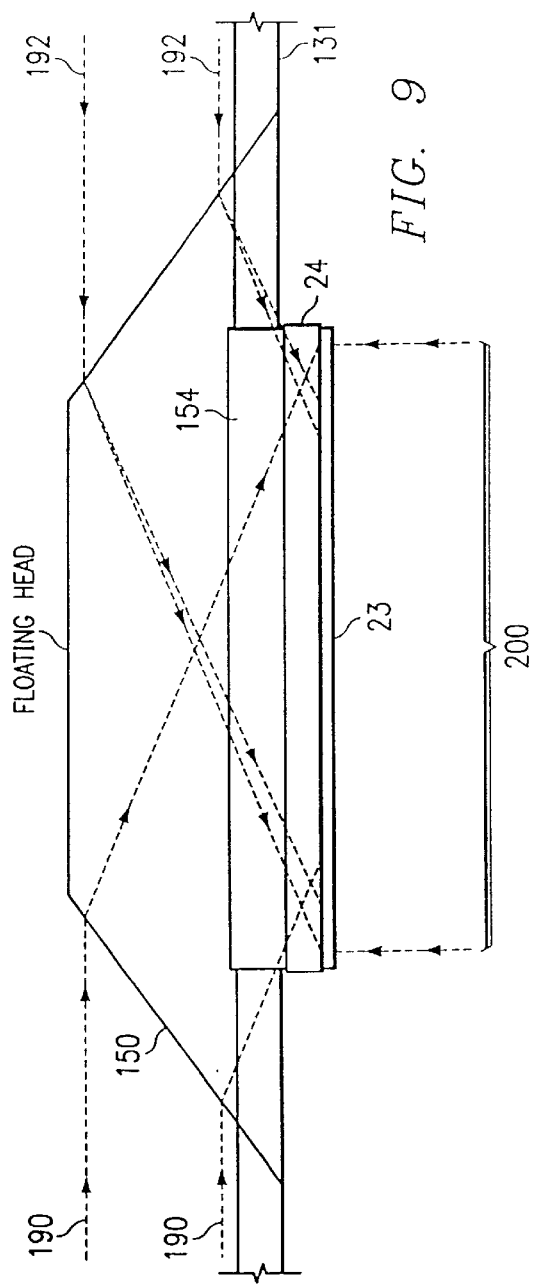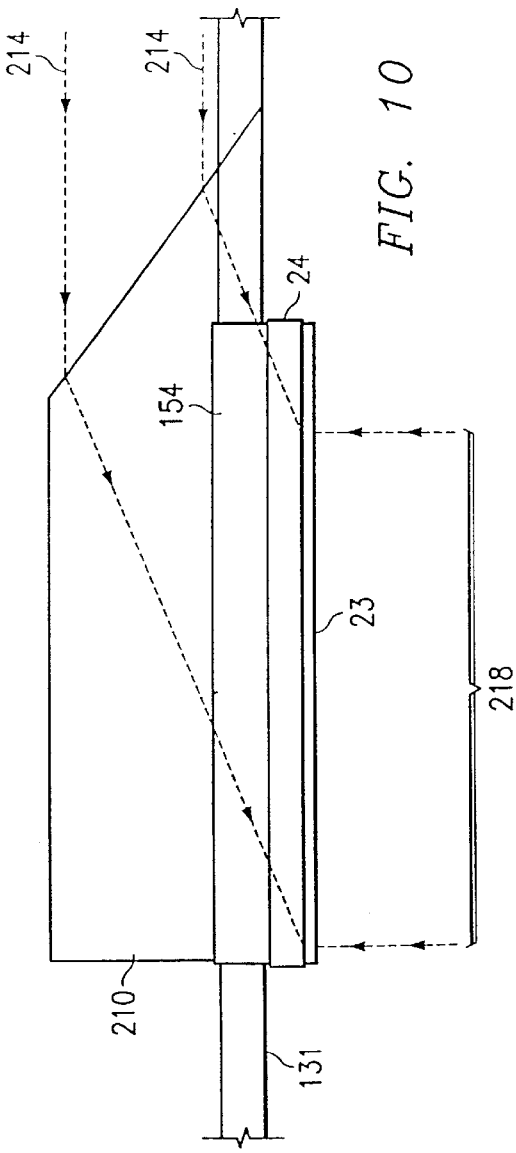

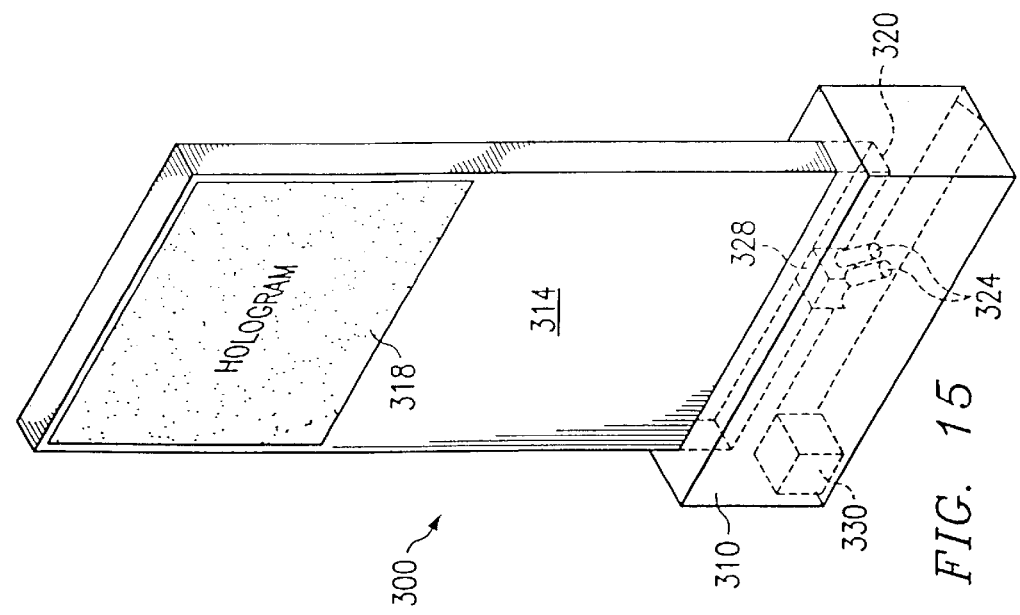
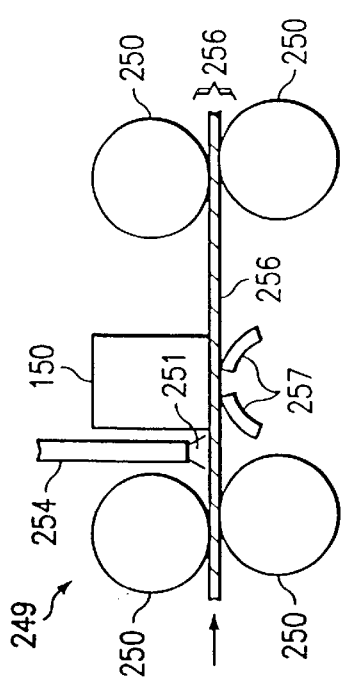
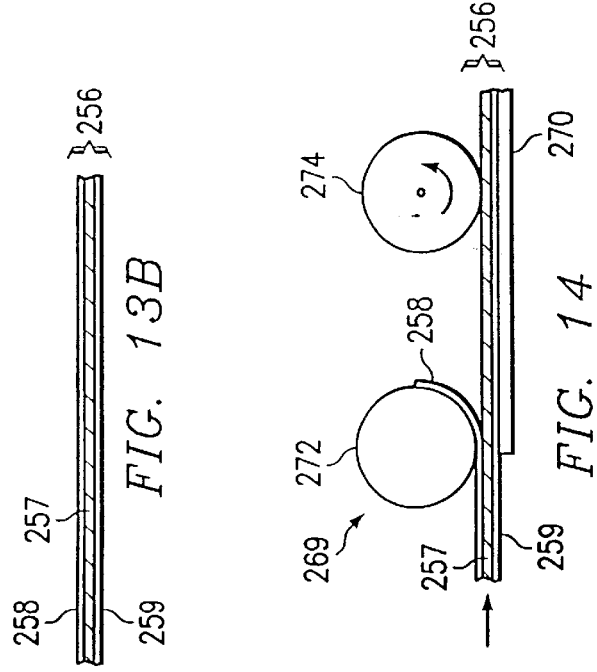

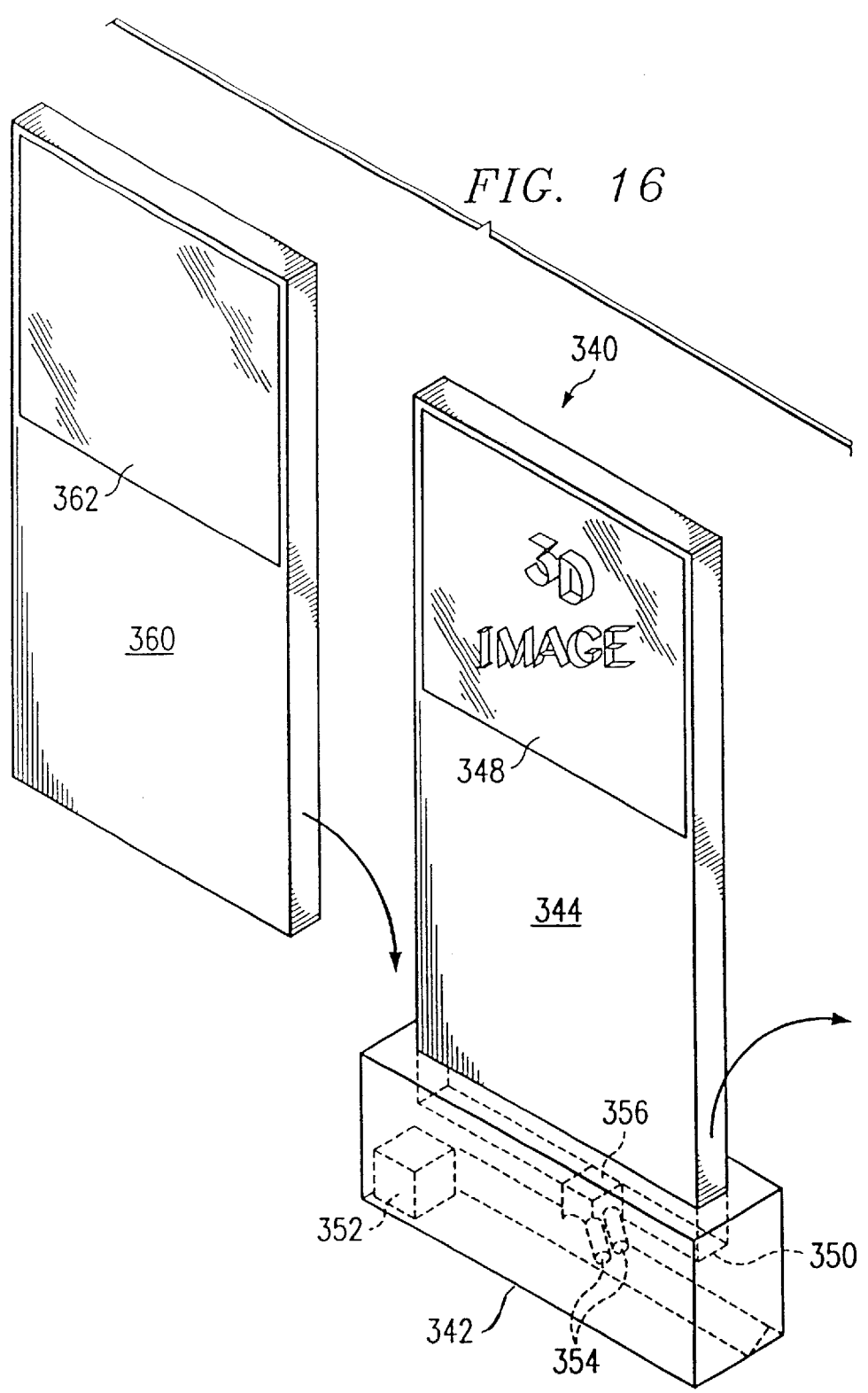

SYSTEM AND METHOD FOR PRODUCING AND DISPLAYING A ONE-STEP, EDGE-LIT HOLOGRAM

This application is a division of Application No. 09/504,730, filed Feb. 16, 2000, which claims the benefit of U.S. Provisional Application No. 60/120,433, filed Feb. 16, 1999.

RELATED APPLICATION

This application claims the benefit of previously filed provisional application Ser. No. 60/120,433 filed Feb. 16, 1999 entitled System and Method for Producing and Displaying a One-Step, Edge-Lit Hologram.

TECHNICAL FIELD OF THE INVENTION

The present invention relates in general to the field of hologram production and display and, more particularly, to a system and method for producing and displaying a one-step, edge-lit hologram.

BACKGROUND OF THE INVENTION

Edge-illuminated or edge-lit holograms are considered to be a subcategory of holographic displays, in general. Typically, conventional edge-lit holograms are recorded onto a holographic recording material mounted on a material supporting substrate. The edge-lit hologram is then reconstructed by an illumination source that introduces an illumination beam through the edge of the substrate. The illumination beam preferably strikes the material supporting substrate at a steep angle relative to a light ray extending perpendicular to the surface of the substrate.

Edge-lit holograms contain interesting display properties. The holographic image can only be reconstructed with an illumination source introduced through the edge of the substrate. The illumination source is preferably disposed within the display. Thus, the display may be self contained which allows the holographic image to be protected from detrimental effects of ambient light sources. Some conventional systems place the illumination source relatively close to the edge-lit hologram. Additionally, some conventional systems integrate the illumination source with the edge-lit hologram in a stand-alone self-contained display. Such a system can eliminate the need for placement and adjustment of external illumination sources.

However, the recording and production of edge-lit holograms can be problematic. A typical hologram production system introduces an object beam carrying a digitally rendered image to coincide with a reference beam. The interference of the two beams forms a hologram on associated holographic recording material. To satisfactorily record the edge-lit hologram, the reference beam should approximate the high angle of incidence of the intended image reconstruction illumination source, taking into consideration optical characteristics of the material supporting substrate through which the eventual illumination source will travel. In general, a reference beam that sufficiently approximates such properties can be referred to as an "edge-lit reference beam."

One conventional system for producing edge-lit holograms is disclosed in "A Printer for Edge-Lit Holographic Stereograms," by Sean T. Nolan, which is a thesis submitted to the Department of Electrical Engineering Computer Sciences of Massachusetts Institute of Technology in February 1994. This reference documents a printer geometry that incorporates a reference beam introduced to a series of lenses that produce an anamorphically collimated reference beam with dimensions of approximately 25 millimeters by 0.4 millimeters. In order to condition the reference beam into an edge-lit reference beam, the disclosed device uses a plateholder consisting of a thick polymethylmethacrilate (PMMA) plinth and glass sandwich. The anamorphic or edge-lit reference beam is then introduced to the holographic recording material through the edge of the PMMA plinth.

This conventional production process is disadvantageous because the plinth is generally permanently laminated to the glass plateholder. Thus, the plinth must be approximately the same size as or larger than the hologram being recorded which typically limits the size of the hologram that the system can produce.

Another disadvantage of many conventional systems is introduction of the reference beam into an edge cut perpendicular to the face of the plate. This arrangement links the thickness of the PMMA plinth to the illumination angle of the hologram and further limits the size of the eventual hologram that can be produced.

A further disadvantage is that many conventional systems can not record full parallax edge-lit holograms and can not record full-color holograms.

One step hologram production technology has been used to satisfactorily record a hologram without the traditional step of creating a preliminary hologram. Both computer image holograms and non-computer image holograms may be produced by such one step technology. Also, not all computer image holograms are produced by one step technology. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam.

SUMMARY OF THE INVENTION

In accordance with teachings of the present invention, a system and method are disclosed for producing and displaying a one-step, edge-lit hologram that provide significant advantages over prior edge-lit hologram production and display systems and methods.

According to one aspect of the present invention, a system for producing an edge-lit hologram comprises an object beam head, a reference beam head and a frame. The object beam head directs an object beam, and the reference beam head directs an edge-lit reference beam to interfere with the object beam. The holographic recording material and the object beam head and the reference beam head may then be translated in accordance with teachings of the present invention to record the hologram. The translation successively exposes multiple portions of the holographic recording material to interference of the object beam and the edge-lit reference beam to record an edge-lit hologram on the holographic recording material.

For one embodiment, the holographic recording material may be moved relative to the object beam head and the reference beam head which remain in a generally fixed position relative to each other. For another embodiment, the object beam head and the reference beam head may be moved in unison with respect to the holographic recording material which remains in a generally fixed position. For a further embodiment, the holographic recording material may be moved relative to the object beam and the edge-lit reference beam which are also moving substantially in unison with each other relative to the holographic recording material. For some embodiments, the reference beam head may comprise an assembly base and a prism coupled to the assembly base, where the prism is operable to receive the reference beam and condition the reference beam into an edge-lit reference beam.

Another aspect of the present invention includes a system for displaying an edge-lit hologram. The system preferably includes a base enclosure and a light source. The base enclosure may be formed to removably receive an edge of a plinth having an edge-lit hologram mounted thereon. The light source is preferably positioned within the base enclosure and provides an illumination beam to reconstruct the edge-lit hologram when the plinth is received by the base enclosure.

A technical advantage of the present invention is that the size of an edge-lit hologram to be produced is not limited to the size of the associated production optics. For example, a reference beam head incorporating teachings of the present invention may be used to record a hologram having dimensions substantially larger than the reference beam head.

Another technical advantage of the present invention is that an edge-lit reference beam does not have to be introduced into a perpendicular edge. Thus, the size of the edge-lit hologram to be recorded is not limited by the thickness of a plate or plinth having such an edge.

An additional technical advantage of the present invention is that either a horizontal parallax only or a full parallax edge-lit hologram can be recorded.

A further technical advantage of the present invention is that full-color edge-lit holograms may be recorded and displayed with substantially reduced color "crosstalk."

Still another technical advantage of the present invention is that multiple object beams and multiple edge-lit reference beams may be used to substantially increase the speed of printing an edge-lit hologram.

Another aspect of the present invention includes the use of one or more holographic optical elements (HOE) which may be placed along a respective edge of an edge-lit hologram opposite from an associated illumination source. Each HOE is preferably selected to function as a collimating mirror with respect to the associated illumination source which may be disposed adjacent to an opposite edge of the associated edge-lit hologram. Each HOE is selected to fold or reflect a beam of light from the associated illumination source at appropriate angles required for display of the associated edge-lit hologram. Placing an illumination source on one edge of an edge-lit hologram and an HOE on an opposite edge of the edge-lit hologram in accordance with teachings of the present invention will often allow a substantial reduction of the size or the length of the plinth or substrate used to support the edge-lit hologram.

Depending upon the type of image hologram which will be displayed, such as horizontal parallax only or full parallax, the present invention allows placing illumination sources and associated holographic optical elements at the desired location to minimize color crosstalk and to substantially reduce the size of the associated plinth and other components of the respective display systems.

A still further aspect of the present invention includes combining multiple color selective HOEs with corresponding colored illumination sources to substantially reduce or eliminate color crosstalk which is often associated with conventional techniques for illuminating edge-lit holograms. For example, a red illumination source may be disposed on a first edge of an edge-lit hologram and an HOE which is color selective with respect to collimating and reflecting a red light beam may be disposed on a second edge of the edge-lit hologram opposite from the first edge. In a similar manner a green illuminating source may be disposed on the second edge of the edge-lit hologram and an HOE selected to collimate and reflect green light may be disposed on the first edge of the edge-lit hologram. Each HOE is preferably transparent to any color other than the selected color which the HOE will collimate and reflect. For the above example the red HOE will reflect and collimate red light and will be effectively transparent to blue light, green light or any other color of light. The green HOE will reflect and collimate green light and will be effectively transparent to blue light, red light or any other color of light. The present invention allows placing colored light sources adjacent to selected edges of an edge-lit hologram to effectively reduce or eliminate color crosstalk.

The present invention teaches various techniques and apparatus for combining edge-lit hologram production with one step hologram production which makes possible the production of three dimensional hologram images that can be illuminated with an integrated light source to simplify and minimize the size of the resulting self-contained holographic display.

Other technical advantages should be apparent to one of ordinary skill in the art in view of the specification, drawings and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 8 is a schematic diagram of one embodiment of a reference beam head for use in a system for producing full color, HPO, edge-lit holograms;

FIG. 9 is a schematic diagram of one embodiment of prism for use in a system for producing full color edge-lit holograms;

FIG. 10 is a schematic diagram of one embodiment of a prism for use in a system for producing monochrome edge-lit holograms;

FIG. 13A is a schematic diagram of another embodiment of a system for producing edge-lit holograms;

FIG. 13B is a schematic diagram of one embodiment of holographic recording material used for recording edge-lit holograms;

FIG. 14 is a schematic diagram of a further embodiment of a system for producing edge-lit holograms;

FIG. 15 is a schematic diagram of one embodiment of a system for displaying an edge-lit hologram;

FIG. 16 is a schematic diagram of a one embodiment of a system for displaying an interchangeable edge-lit hologram;

DETAILED DESCRIPTION OF THE INVENTION

Preferred embodiments of the present invention and its advantages are best understood by reference to FIGS. 1–21 of the drawings, light numerals being used for like and corresponding parts of the various drawings.

Figure 1:
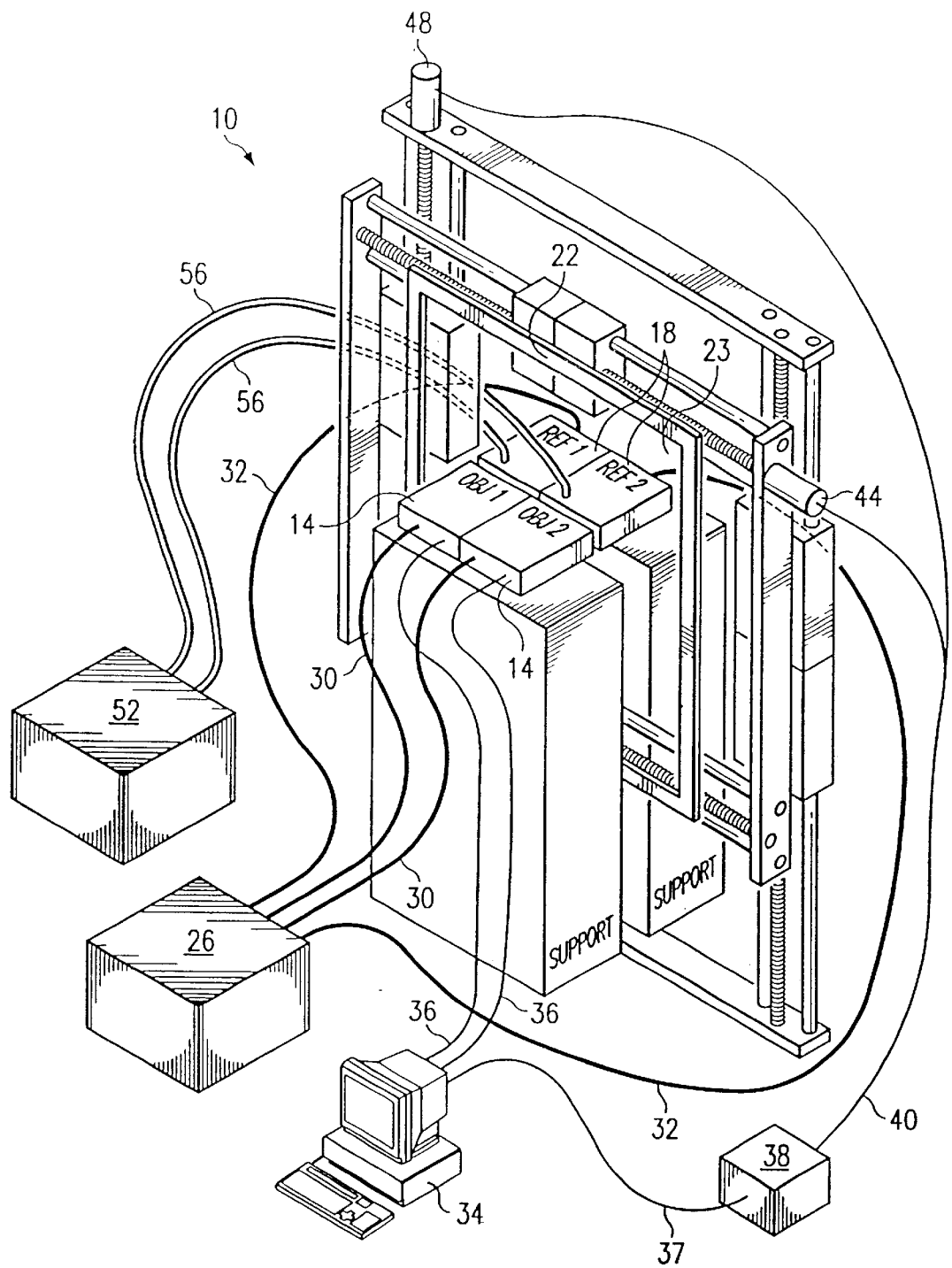
FIG. 1 is a schematic diagram of one embodiment of a system for producing horizontal parallax only (HPO) edge-lit holograms.

FIG. 1 is a diagram of one embodiment of a system, indicated generally at 10, for producing horizontal parallax only (HPO) edge-lit holograms. As shown, system 10 includes multiple object beam heads 14 and multiple reference beam heads 18. However, it should be understood that fewer or more object beam heads 14 and reference beam heads 18 could be used. System 10 further includes a frame 22 and a transparent plateholder 24 with a holographic recording material 23. Frame 22 positions plateholder with the holographic recording material 23 disposed thereon such that the interference of an object beam from object beam heads 14 and an-edge-lit reference beam from reference beam heads 18 will record an edge-lit hologram onto the holographic recording material. Production optics such as object beam heads 14 and reference beam heads 18 are preferably provided as part of system 10.

The present invention may be satisfactorily used to produce full parallax and full color edge-lit -holograms. The present invention may also be satisfactorily used to produce edge-lit holograms on a wide variety of holographic recording material including but not limited to roll-to-roll film. The present invention may be satisfactorily used with a wide variety of equipment and techniques for positioning holographic recording material, object beam heads and reference beam heads relative to each other. The present invention is not limited to the specific equipment and techniques which are described in more detail in this written description.

In the embodiment of FIG. 1, a transparent plateholder 23 is coupled to frame 22 and is positioned between object beam heads 14 and reference beam heads 18. Plateholder 23 may include, for example, a glass plate. A holographic recording material, such as silver halide or photopolymer film, may be coupled to plateholder 23. For example, the holographic recording material may be coupled to the side of plateholder 23 proximate object beam heads 14 or the opposite side of plateholder 23 proximate reference beam heads 18.

System 10 further includes light source 26 which may be coupled to object beam heads 14 through respective optical fiber cables 30. Light source 26 may also be coupled to reference beam heads 18 through respective optical fiber cables 32. For some applications, light source 26 may be satisfactorily coupled with object beam heads 14 and reference beam heads 18 using a system of mirrors and/or lenses (not expressly shown).

Light source 26 preferably provides a coherent light beam to object beam heads 14 and reference beam heads 18. Light source 26 may be, for example, a monochrome laser or a red-blue-green laser. A wide variety of lasers may be satisfactorily used as light source 26. Object beam heads 14 are preferably coupled to a computer 34 through respective video lines 36. Computer 34 uses serial communications line 37 to provide control signals to a motor controller 38. Motor controller 38 is, in turn, coupled through communications lines 40 to a first axis motor 44 and a second axis motor 48. Additionally, an index matching fluid pump 52 is preferably coupled to reference beam heads 18 through respective fluid tubes 56 and provides index matching fluid to reference beam heads 18. As discussed below, reference beam heads 18 use the index matching fluid to condition the edge-lit reference beams.

In operation, light source 26 provides a coherent light beam to object beam heads 14 and reference beam heads 18. In the illustrated embodiment, this-coherent light beam is carried to object beam heads 14 and reference beam heads 18 through optical fibers 30 and 32. However, it should be understood that other components, such as a system of mirrors, could carry the coherent light beam to object beam heads 14 and reference beam heads 18.

After receiving a coherent light beam from light source 26, object beam heads 14 direct an object beam toward the holographic recording material. After receiving a coherent light beam from light source 26, reference beam heads 18 condition or transform the coherent light beam into a edge-lit reference beam. The edge-lit reference beam simulates the angle and conditions of an illumination source for displaying the edge-lit hologram. Reference beam heads 18 then direct the edge-lit reference beam to interfere with the object beam and to record an edge-lit hologram on the holographic recording material.

System 10 of FIG. 1 is generally controlled through the operation of computer 34. For example, computer 34 provides video image signals for one or more spatial light modulators (SLMs) in object beam heads 14. In general, an SLM is a device that can display a two-dimensional image. Object beam heads 14 then pass the object beam through the associated SLMs such that the interference of an object beam and a respective reference beam will record a holographic image on the holographic recording material.

Computer 34 may also provide control signals to the SLMs in order to properly record each elemental hologram in the associated one-step production process. computer 34, through motor controller 38, also controls first axis motor 44 and second axis motor 48. As such, computer 34 can effect the translation of frame 22. This translation allows multiple portions of the holographic recording material to be successively exposed to the interference of object beams from object beam heads 14 and respective edge-lit reference beams from reference beam heads 18. Thus, computer 34 coordinates the images of the SLMs in object beam heads 14 with the movement of frame 22 such that individual hogels can be successively recorded on the holographic recording material to create a large edge-lit hologram.

In system 10 of FIG. 1, object beam heads 14 can direct respective anamorphically collimated object beams of the SLM image to be projected upon the holographic recording material. Similarly, reference beam heads 18 can direct respective anamorphically collimated edge-lit reference beams to interfere with a selected object beam. Each object beam/reference beam interference creates a horizontal parallax only (HPO) holographic image. In this embodiment, object beam heads 14 and reference beam heads 18 are generally stationary. Frame 22 preferably translates the holographic recording material along a first axis and a second axis substantially perpendicular to the first axis. As mentioned above, this translation allows multiple portions of the holographic recording material to be successively exposed to the interference of the object beams and respective edge-lit reference beams.

It should be understood that alternate arrangements can be used to provide for a similar result. For example, in one alternate arrangement, object beam heads 14 and reference beam heads 18 can be coupled to the frame. The holographic recording material may remain generally stationary, while the frame is operable to translate the object beam heads and respective reference beam heads in unison with each other such that multiple portions of the holographic recording material are exposed to the interference of the object beams and respective edge-lit reference beams. For other applications object beam head 14 and reference beam head 18 may be translated generally in unison with each other while frame 22 translates the holographic recording material at substantially the same time. Teachings of the present invention may be satisfactorily used to record an edge-lit hologram on roll-to-roll film or any other type of holographic recording material.

Figure 2:
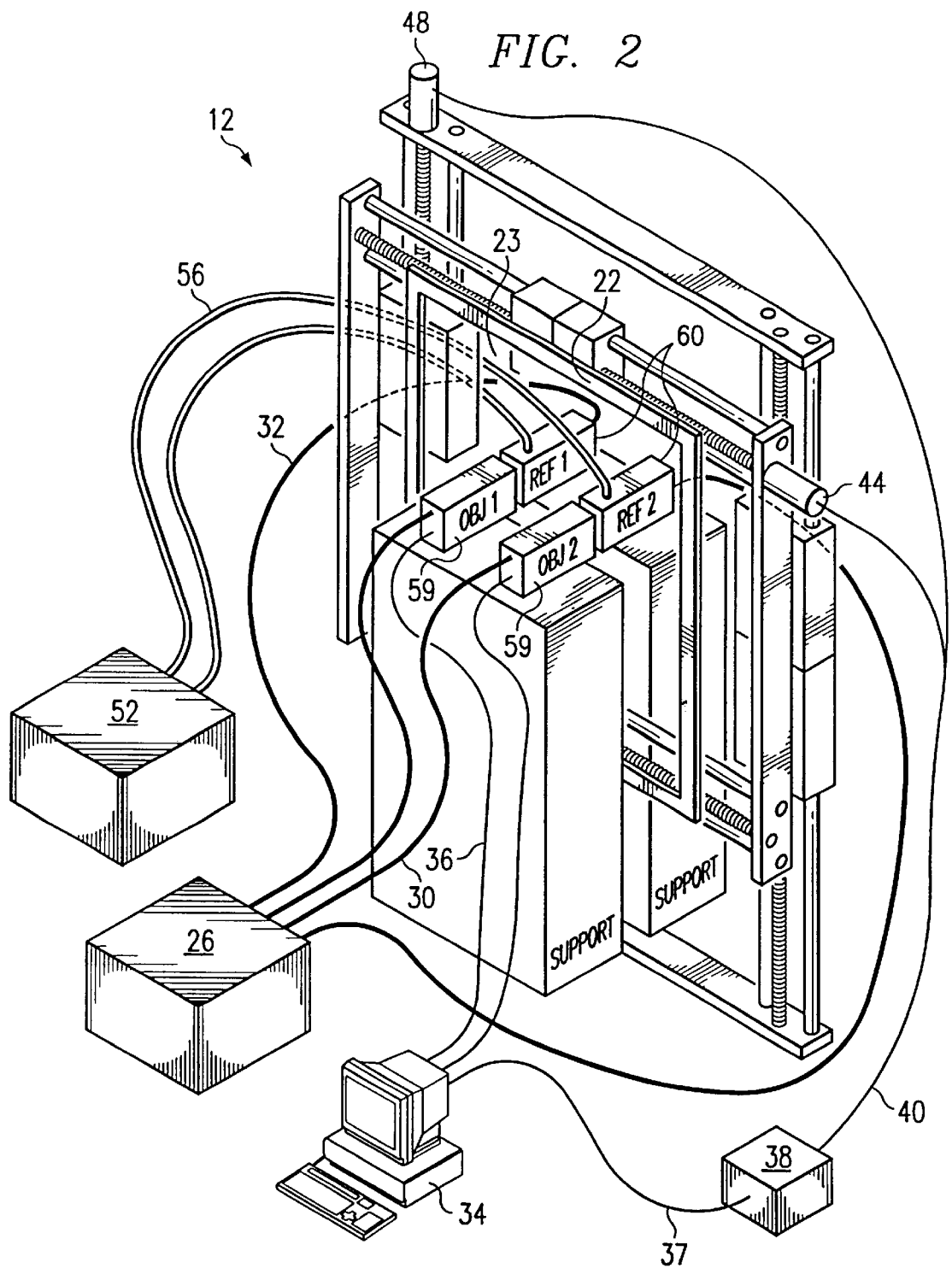
FIG. 2 is a schematic diagram of one embodiment of a system for producing full parallax edge-lit holograms.

FIG. 2 is a diagram of one embodiment of a system, indicated generally at 12, for producing full parallax edge-lit holograms. As shown, system 12 comprises many of the same components as system 10 of FIG. 1. However, in system 12, object beam heads 59 and reference beam heads 60 differ from the analogous components in system 10 of FIG. 1. In FIG. 2, object beam heads 59 and reference beam heads 60 are operable to provide respective object beams and collimated edge-lit reference beams. Interference between the object beams and respective edge-lit reference beams may be used to produce a full parallax edge-lit hologram on the holographic recording material. The beam output of object beam heads 59 and reference beam heads 60 can approximate in size, for example, an elemental hologram or hogel. Therefore, object beam heads 59 and reference beam heads 60 of system 12 may be smaller than required for analogous counterpart components of an HPO recording system such as system 10 to record the same size hologram.

Figure 3:
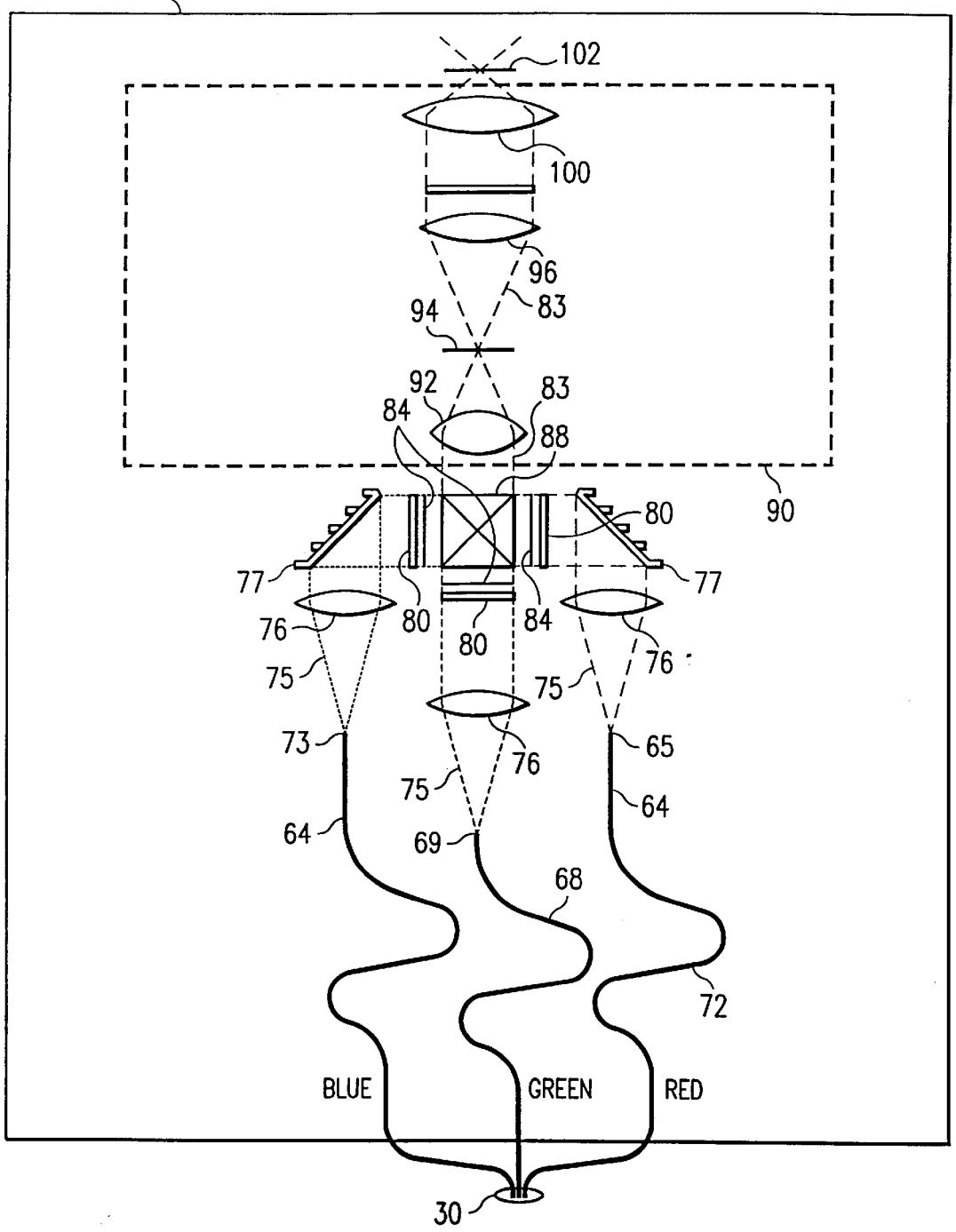
FIG. 3 is a schematic diagram of one embodiment of an object beam head for use in a system for producing full color, full parallax edge-lit holograms.

FIG. 3 is a schematic diagram of one embodiment of an object beam head 59 for use in a system for producing full color, full parallax edge-lit holograms in accordance with the teachings of the present invention. For the embodiment of FIG. 3, object beams 75 are carried by fiber optic cable 30 into object beam head 59. Inside object beam head 59, fiber optic cables 64, 68 and 72 carry the blue, green and red object beams, respectively, into lenses 76. It should be understood, however, that other components, such as a system of mirrors and/or lenses, may replace fiber optic cables 30, 64, 68 and 72 to carry desired object beams 75. In the embodiment of FIG. 3, object beams 75 are transmitted by fiber optic cables 64, 68 and 72 to fiber optic tips 65, 69 and 73 which are located in the focal planes of respective lenses 76. Object beams 75 then pass through respective lenses 76, reflect off mirrors 77 (if necessary) and pass through respective SLMs 80. Object beams 75 also pass through band-limited diffusers 84, which may be color specific.

Lenses 76 operate to expand and collimate object beams 75 such that object beams 75 more evenly illuminate SLMs, 80. In general, SLMs 80 allow the production of full-color holographic stereograms. In one embodiment, SLMs 80 comprise LCD panels of high resolution, such as 1,280×1, 024 pixels, where the total size of each LCD panel is approximately 10 cm×10 cm. However, smaller LCD panels may be used with the same or a different number of pixels.

After passing through diffusers 84, object beams 75 are directed through an optical combiner unit 88 that uses, for example, two dichroic combiners in an "x" configuration (or other suitable optical combiners) to combine the three object beams 75 into a single object beam 83. In the embodiment of FIG. 3, single object beam 83 then passes through tail end optics 90.

As shown, tail end optics 90 comprises a first projection lens 92 and a Fourier transform filter 94 that may remove undesired effects such as, but not limited to, high frequency image components like pixel or grid artifacts that result from an SLM display with pixels separated by an opaque matrix.

The object beam 83 then passes through a second projection lens 96 and a converging lens 100. The first projection lens 92 is located such that images of SLMs 80 lie in the focal plane of first projection lens 92. Fourier transform filter 94 is located in the focal planes of both first projection lens 92 and second projection lens 96. However, in alternate embodiments, tail end optics 90 may not use first and second projection lenses 92 and 96 or the Fourier transform filter 94. Lastly, converging lens 100 is located such that its focal plane intersects an exposure plane 102 of the associated holographic recording material.

Figure 4:
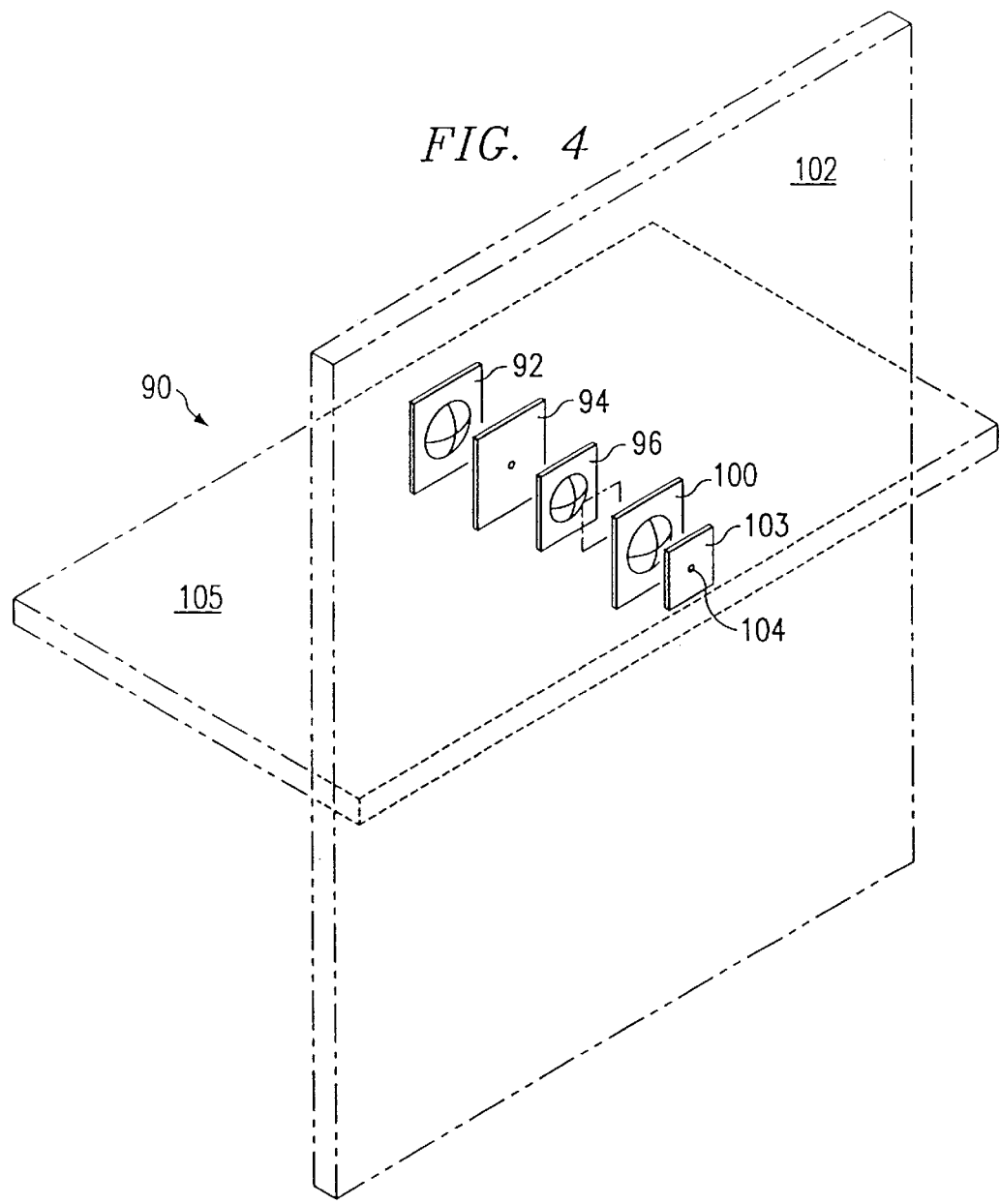
FIG. 4 is a schematic diagram of one embodiment of tail end optics in an object beam head of a system for producing full parallax edge-lit holograms.

FIG. 4 is a diagram of one embodiment of tail end optics 90 in object beam head 59 of system 12. As discussed above, tail end optics 90 comprises first projection lens 92, Fourier transform filter 94, second projection lens 96 and converging lens 100. As shown, these components may be coupled to base platform 105. In the embodiment of FIG. 4, lenses 92, 96 and 100 are preferably achromat lenses for producing full color holograms. Alternatively, lenses 92, 96 and 100 may be monochrome lenses for recording monochrome holograms. Tail end optics 90 of FIG. 4 may also include exposure mask plate 103 with exposure aperture 104 disposed proximate exposure plane 102. Exposure mask plate 103 may be used to limit the object beam from overexposing holographic recording material placed in the adjacent exposure plane 102. For example, exposure aperture 104 may be sized to approximately match a hogel. For some alternative embodiments, tail end optics 90 may not include first and second projection lenses 92 and 96 and/or Fourier transform filter 94.

Figure 5:
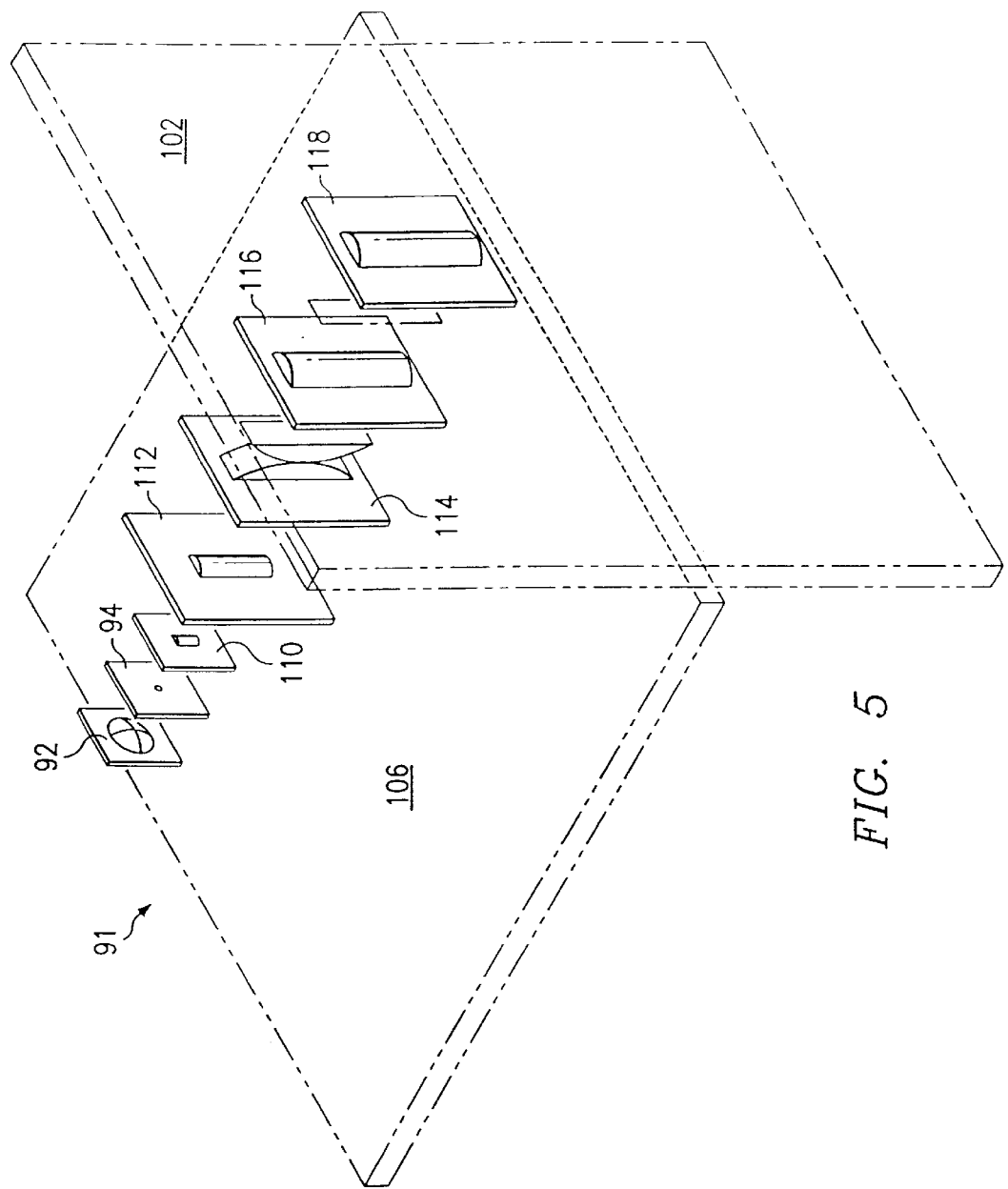
FIG. 5 is a schematic diagram of one embodiment of tail end optics for an object beam head in a system for producing HPO edge-lit holograms.

FIG. 5 is a diagram of one embodiment of tail end optics for an object beam head in a system for producing HPO edge-lit holograms. Tail end optics 91 of FIG. 5 can operate, for example, in place of tail end optics 90 of FIGS. 3 and 4. Tail end optics 91 preferably includes a base platform 106 to which is coupled a first projection lens 92, Fourier transform filter 94 and cylindrical achromat lenses 110, 112, 114, 116 and 118. All of the components are positioned in the path of an object beam. For some applications, tail end optics 91 may be provided without projection lenses 92, Fourier transform filter 94 and/or acromatic lenses 110 and 112.

In operation, tail end optics 91 produces an anamorphic image of the image rendered by associated SLMs in the object beam head. Thus, the effect of tail end optics 91 is to produce an anamorphic object beam. For one application the resulting anamorphic object beam may have a generally extended oval shaped cross section. Interference between a proper edge-lit reference beam in exposure plate 102 with the output beam from tail end optics 91 will then produce an HPO edge-lit hologram on holographic recording material positioned at exposure plate 102.

Figure 6:
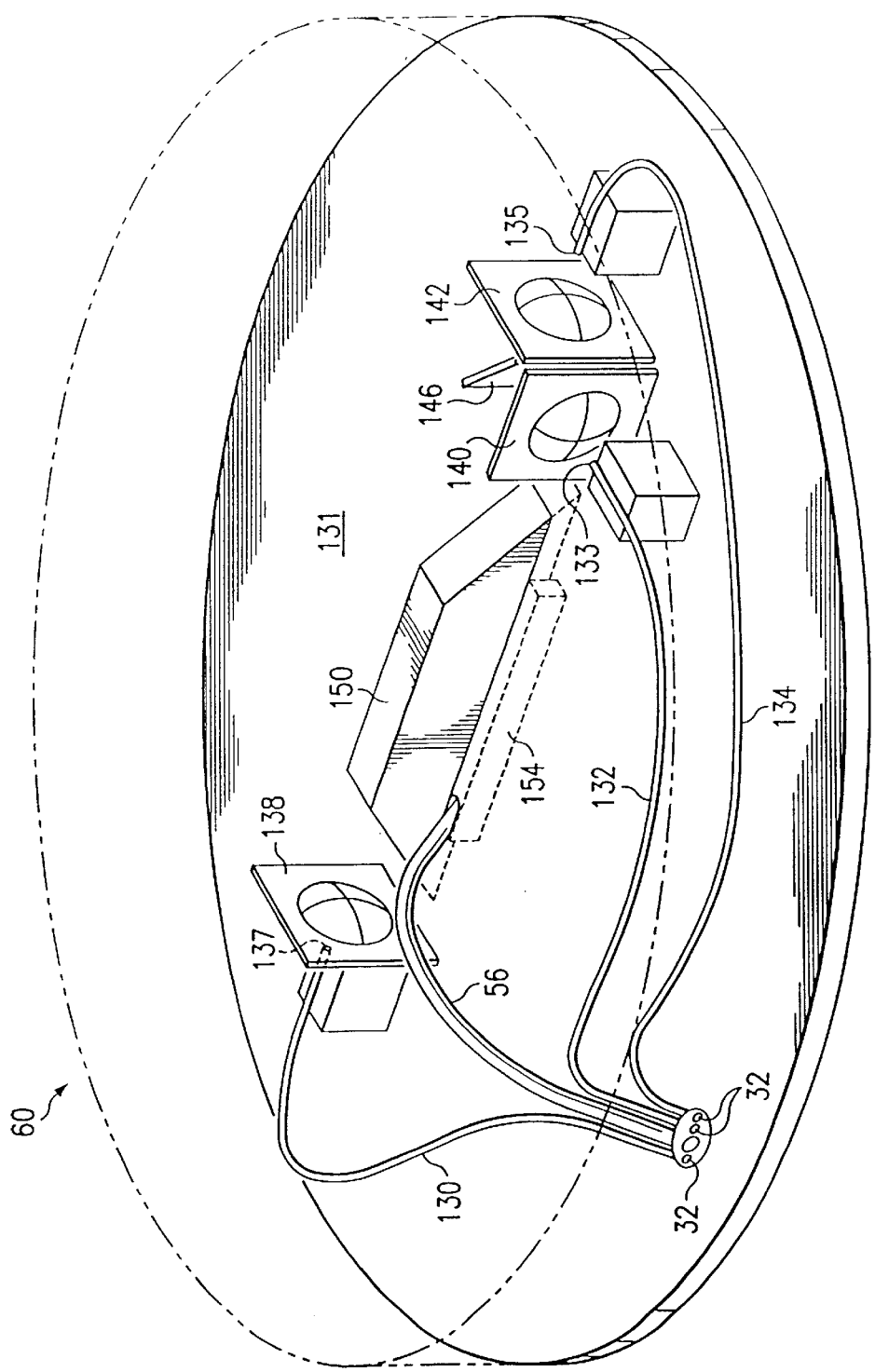
FIG. 6 is a schematic diagram of one embodiment of a reference beam head for use in a system for producing full color, full parallax, edge-lit holograms.
Figure 7:
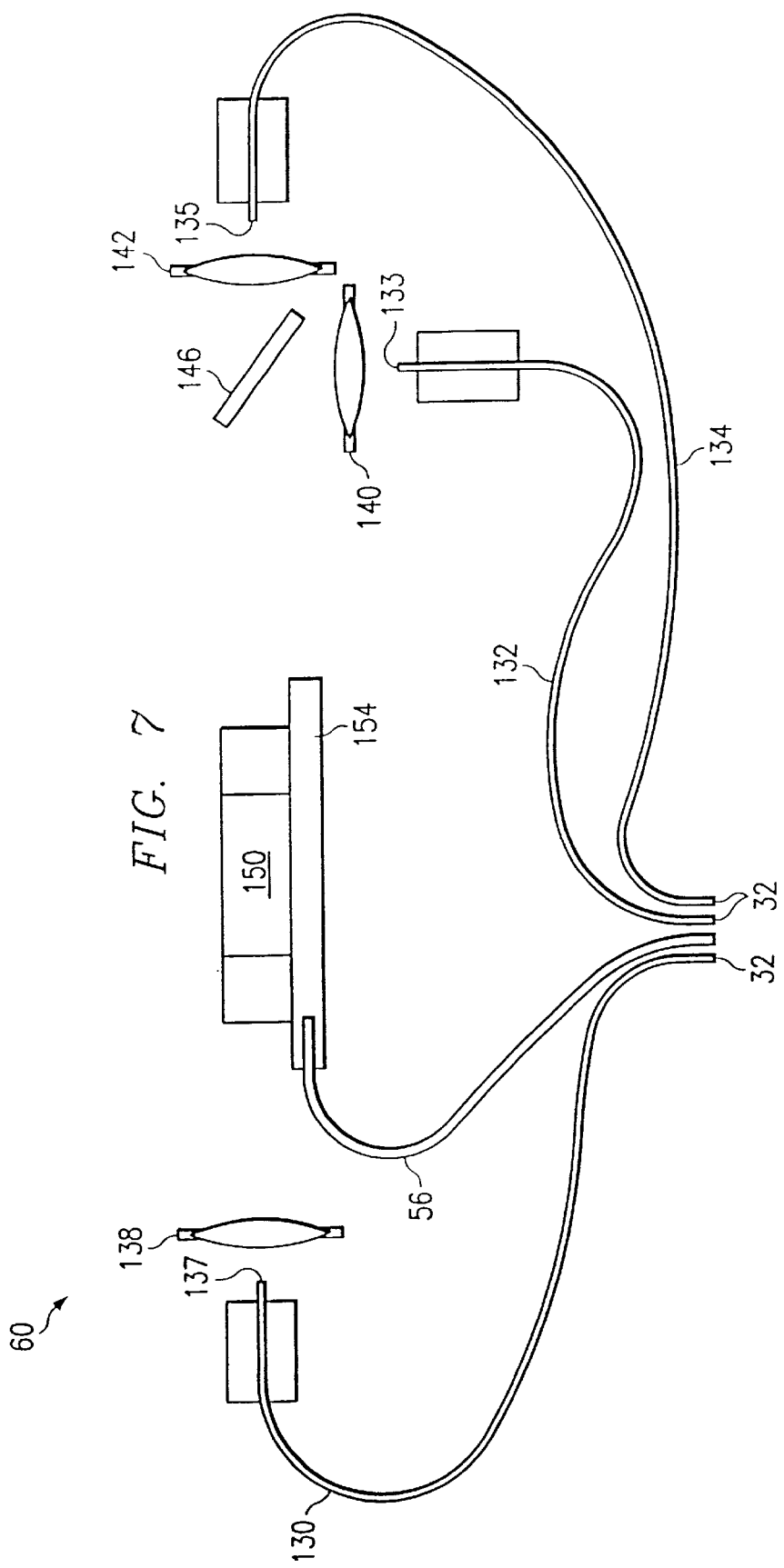
FIG. 7 is a top view of the reference beam head of FIG. 6.

FIG. 6 is a diagram of one embodiment of a reference beam head, indicated generally at 60, for use in a system for producing full color, full parallax, edge-lit holograms. FIG. 7 is a top view of reference beam head 60 of FIG. 6. Reference beam head 60 may be used, for example, in system 12 of FIG. 2. As shown in FIGS. 6 and 7, optical fiber 32 carries a reference beam to reference beam head 60. Then, inside reference beam head 60, separate optical fibers 130, 132 and 134 carry green, blue and red beams, respectively, to tips 137, 133 and 135. Alternately, a system of mirrors and/or lenses may be used rather than optical fibers 130, 132 and 134 to carry the desired reference beams.

A plurality of collimating lenses 138, 140 and 142 are preferably coupled to an assembly base 131 and positioned proximate respective tips 137, 133 and 135. For example, collimating lenses 138, 140, and 142 may be spherical collimating lenses. A dichroic combiner 146 is also coupled to assembly base 131 and positioned to receive beams from optical fibers 132 and 134. As shown, reference beam head 60 further includes a prism 150 and a reservoir 154 coupled to assembly base 131.

In operation, tips 137, 133 and 135 are oriented to deliver green, blue and red beams, respectively, to prism 150. As shown, dichroic combiner 146 is positioned to receive two of the three beams (e.g., the blue and red beams) to provide a combined beam of the two beams to prism 150. Collimating lenses 138, 140 and 142 are preferably positioned in a path of the respective beams and operate to receive and condition the beams so that they can create a full parallax edge-lit hologram when the beams eventually interfere with an object beam.

For some applications in which a full parallax hologram is produced, tips 137, 133 and 135 may be oriented relative to each other at angles other than as shown in FIGS. 6 and 7. For example, the respective red, blue and green reference beams may intersect with each other at an angle of approximately ninety degrees (90°). Full parallax holograms may be satisfactorily prepared in accordance with teachings of the present invention without combining the red and blue reference beams as shown in FIGS. 6 and 7.

Edge-lit full-color holograms are typically dispersive, suffering from classic signal crosstalk problems when illuminated with red, green, and blue light sources. Crosstalk between the green and red illumination sources, and between the green and blue illumination sources, is generally much worse than crosstalk between the red and blue illumination sources since proximity of respective light wavelengths is generally inversely proportional to crosstalk problem. The present invention allows separating respective illumination source angles, particularly where color crosstalk may be most apparent.

A rectangular shaped edge-lit hologram with a red illumination source on a first edge, a green illumination source on a second edge extending approximately ninety degrees (90°) relative to the first edge, and a blue illumination source on a third edge extending approximately one hundred and eighty degrees (180°) relative to the first edge in accordance with teachings of the present invention would often exhibit substantially no detectable color crosstalk. Placing the red and blue illumination sources together on the first edge, and green illumination source on the second edge extending approximately ninety degrees (90°) relative to the first edge, or the third edge extending approximately one hundred and eighty degrees (180°) relative to the first edge in accordance with teachings of the present invention, would also be acceptable because red and blue wavelengths are far enough apart to be on the same edge. As previously noted the present invention is not limited to rectangular shaped edge-lit holograms.

In FIGS. 6 and 7, reservoir 154 preferably contains an index matching fluid selected to have an index of refraction value approximately equal to the index of refraction value associated with optically transmissive materials in contact with prism 150. Reservoir 154 is preferably formed to allow a layer of the selected index matching fluid to be disposed between prism 150 and the holographic recording material. Fluid tube 56 replenishes the supply of index matching fluid to reservoir 154.

After striking prism 150, the reference beams travel through prism 150. Prism 150 and the index matching fluid then operate together to condition or transform the reference beam into an edge-lit reference beam by changing the incidence angle of the reference beam. After this conditioning, the intersection of the edge-lit reference beam and the object beam can create an interference pattern sufficient to form a full-parallax edge-lit hologram.

FIG. 8 is a diagram of one embodiment of a reference beam head, indicated generally at 18, for use in a system for producing full color, HPO, edge-lit holograms. Reference beam head 18 may be used, for example, in conjunction with system 10 of FIG. 1. As can be seen, the embodiment of FIG. 8 is similar to the embodiment of FIG. 6. However, collimating lenses 138, 140 and 142 are replaced with anamorphic collimating lenses 160, 170 and 180, respectively. Anamorphic collimating lenses 160, 170 and 180 condition the respective reference beams sufficiently to create an HPO hologram when interfered with by an appropriate object beam.

FIG. 9 is a diagram of one embodiment of a prism for use in a system for producing full color edge-lit holograms. In the embodiment of FIG. 9, prism 150 and reservoir 154 are coupled to assembly base 131. In this embodiment, reservoir 154 is coupled to assembly base 131 on one side of prism 150, and prism 150 is preferably coupled flush to assembly base 131. Assembly base 131 is, in turn, coupled via index matching fluid to a transparent plateholder 24 (e.g., FIGS. 1 and 2) which in turn receives holographic recording material 23.

In operation, green reference beam 190 may enter prism 150 from one direction, and respective red and blue reference beams 192 may enter prism 150 from the opposite direction, as shown. Prism 150 then directs beams 190 and 192 towards plateholder 24 and holographic recording material 23. Reservoir 154 preferably holds a selected index matching fluid to allow a layer of index matching fluid to be formed between and in contact with prism 150 and transparent plateholder 24. This layer may be formed, for example, using "capillary action."Prism 150 and the layer of index matching fluid operate to transform reference beams 190 and 192 into respective edge-lit reference beams. As shown, an object beam 200 is directed from an object beam head positioned on an opposite side of plateholder 24 and holographic recording material 23. Reference beams 190 and 192 and object beam 200 then intersect at holographic recording material 23. Interference of the reference beams and respective object beams will record an edge-lit hologram on holographic recording material 23.

It should be understood that, in the embodiment of FIG. 9, prism 150 and index matching fluid reservoir 154 can operate to produce full color edge-lit holograms in both full parallax and HPO. For full parallax, a reference beam head would collimate reference beams 190 and 192. For an HPO edge-lit hologram, the reference beam head would anamorphically collimate reference beams 190 and 192. As previously noted, full parallax holograms may be satisfactorily formed without aligning the red and blue reference beams coincident with each other.

FIG. 10 is a diagram of one embodiment of a prism for use in a system for producing monochrome edge-lit holograms. Similar to FIG. 9, prism 210 is coupled to assembly base 131. Reservoir 154 is coupled to one side of prism 210. Transparent plateholder 24 is then positioned proximate assembly base 131, and holographic recording material 23 coupled to plateholder 24.

In operation, prism 210 and reservoir 154 perform substantially the same function as prism 150 and reservoir 154 of FIG. 9. However, in the monochrome embodiment of FIG. 10, only one reference beam 214 is directed to prism 210. Thus, reference beam 214 passes through prism 210 and through a layer of index matching fluid. Reference beam 214 then passes through transparent plateholder 24 and interferes with a respective object beam 218 to produce a monochrome edge-lit hologram on holographic recording material 23. As was the case with respect to FIG. 9, prism 210 of FIG. 10 can be used to produce full parallax or HPO holograms, depending on the conditioning of the associated reference beam 214.

Figure 11:
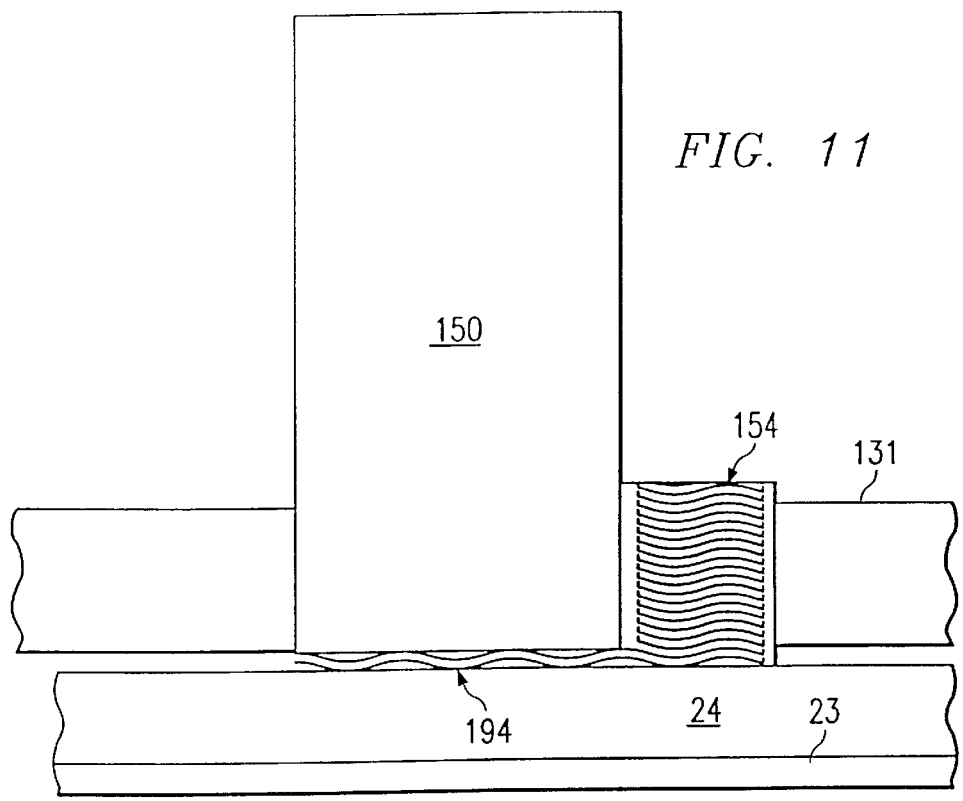
FIG. 11 is a schematic diagram of one embodiment of a prism for use in a system for producing edge-lit holograms.

FIG. 11 is a diagram of one embodiment of a prism for use in a system for producing edge-lit holograms. In particular, FIG. 11 illustrates one embodiment of the layer of index matching fluid through which the reference beam passes. As shown, a prism 150 and a reservoir 154, for holding index matching fluid, are coupled to assembly base 131. A transparent plateholder 24 is positioned proximate assembly base 131, and holographic recording material 23 is coupled to transparent plateholder on a side distant from prism 150. As shown, reservoir 154 is coupled to assembly base 131 on one side of prism 150, and a layer 194 of index matching fluid extends from reservoir 154 between prism 150 and a plateholder 24. In one embodiment, reservoir 154 allows layer 194 to form between prism 150 and transparent plateholder 24 due to "capillary action." This capillary action is the result both of the spacing between assembly base 131, prism 150 and transparent plateholder 24 and of the surface tension created by the proximity of those surfaces.

Thus, in operation, a reference beam can travel through prism 150 and through layer 194 which will transform or condition the reference beam into an edge-lit reference beam. In particular, prism 150 and layer 194 direct the reference beam at a sufficiently steep angle of incidence such that the edge-lit reference beam approximates an eventual illumination source of the edge-lit hologram to be produced. After passing through layer 194, the edge-lit reference beam travels through transparent plateholder 24 and interferes with an object beam at holographic recording material 23.

Figure 12:
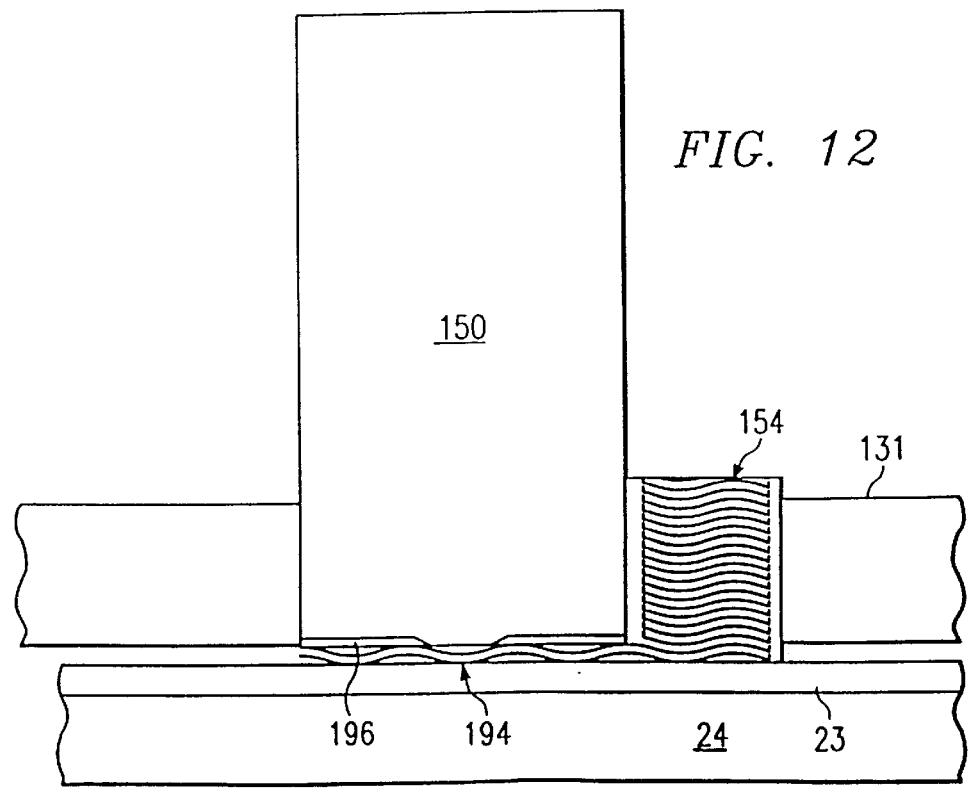
FIG. 12 is a schematic diagram of another embodiment of a prism for use in a system for producing edge-lit holograms.

FIG. 12 is a diagram of another embodiment of a prism for use in a system for producing edge-lit holograms. As with FIG. 11, FIG. 12 particularly illustrates an embodiment of the layer of index matching fluid through which the reference beam passes. As shown, there are several differences between the embodiments of FIG. 12 and FIG. 11. First, the embodiment of FIG. 12 includes a mask layer 196 coupled to the bottom surface of prism 150. Secondly, holographic recording material 23 is coupled to the opposite side of transparent plateholder 24 and is proximate prism 150. In this embodiment, mask layer 196 allows precise control, through sizing of an aperture, of the exposure area of holographic recording material 23 by filtering out portions of the reference beam. The size of the aperture in mask layer 196, for example, could be the size of an elemental hologram.

FIG. 13A is a diagram of another embodiment of a system for producing edge-lit holograms. In particular, FIG. 13A illustrates the movement of holographic recorded material 256 within the system. As shown, in this embodiment, holographic recorded material 256 moves from left to right. Four pinch rollers 250 are positioned in contact with holographic recording material 256, and a fluid spray applicator 254 is positioned proximate holographic recording material 256. Prism 150 is positioned proximate holographic recording material 256, and a pressure spring 257 is positioned to be in contact with holographic recording material 256 below prism 150.

In operation, holographic recording material 256 travels from left to right, and pinch rollers 250 operate to maintain tension on holographic recording material 256. Pressure spring 257 then operates to maintain tension in holographic recording material 256 with respect to prism 150. In this embodiment, fluid spray applicator 254 applies the index matching fluid (e.g., xylene) to a top surface of holographic recording material 256. As described above, prism 150 receives a reference beam and conditions the reference beam to produce an edge-lit reference beam to strike holographic recording material 256 and interfere with an object beam (not shown). One advantage of the embodiment of FIGURE 13A is that an edge-lit hologram may be recorded without the need for a plateholder in the production system.

FIG. 13B is a diagram of one embodiment of holographic recording material 256 used for recording edge-lit holograms. In this embodiment, holographic recording material 256 comprises recording material 257. A top cover sheet 258 is coupled to a top surface of recording material 257, and a bottom cover sheet 259 is coupled to a bottom surface of recording material 257. Recording material 257 can comprise, for example, silver halide film or a photopolymer. Top cover sheet 258 and bottom cover sheet 259 may comprise, for example, transparent polymers such as transparent polyester (PEP) (preferably non-birefringent).

FIG. 14 is a diagram of a further embodiment of a system for producing edge-lit holograms. As with FIG. 13A, FIG. 14 particularly illustrates the movement of holographic recorded material 256 within the system. In this embodiment, holographic recording material 256 comprises recording material 257, top cover sheet 258 and bottom cover sheet 259 as shown in FIG. 13B. A first roller 272 is positioned in contact with top cover sheet 258, and a cylindrical prism coupler 274 is positioned proximate to and in contact with recording material 256. A plateholder 270 is also positioned proximate holographic recording material 256 as shown.

In operation, holographic recording material 256 is moved from left to right. During this movement, first roller 272 removes top cover sheet 258 from holographic recording material 256. Cylindrical prism coupler 274 then rotates in contact with holographic recording material 257 as shown. In this embodiment, cylindrical prism 274 will preferably index match to holographic recording material 256 due to natural tackiness associated with photopolymers and may be used to condition the associated reference beam. Thus, it is a technical advantage of the system of FIG. 14 that an edge-lit hologram can be recorded without using index matching fluid.

FIG. 15 is a schematic diagram representative of previously available systems, indicated generally at 300, for displaying an interchangeable edge-lit hologram. System 300 comprises a base 310 fixedly coupled to a plinth 314. Plinth 314 includes edge-lit hologram 318 produced, for example, by one of the systems described above. Further, an edge 320 of plinth 314 is fixedly attached to base 310. A power source 330 is coupled to base 310 and may include, for example, a battery. A light source 324 is positioned within base 310 and provides light to a concave cylindrical lens 328. Light source 324 may include, for example, one or more light emitting diodes (LED).

In operation, power source 330 provides power to light source 324. Light from light source 324 enters concave cylindrical lens 328 and then enters edge 320 of plinth 314. The light entering edge 320 then acts as a proper illumination source and illuminates hologram 318 such that the recorded image is reconstructed. In the case of conventional edge-lit holograms, such illumination systems must permanently fix edge 320 to base 310 to obtain effective reconstructing light.

The present invention is not limited to producing or displaying a hologram mounted on a plinth having a 5 generally rectangular configuration. The present invention may be satisfactorily used to produce and/or display a hologram mounted on a plinth having various configurations and multi-faceted shapes such as a pentagon, hexagon, octagon, or a smooth curve such as circular or oval shapes.

FIG. 16 is a diagram of a one embodiment of a system, indicated generally at 340, for displaying an interchangeable edge-lit hologram. In this embodiment, system 340 comprises a base enclosure 342 formed to removably receive an edge 350 of a plinth 344. An edge-lit hologram 348 is mounted to plinth 3447. A light source 354 is positioned within base enclosure 342 and produces an illumination beam to reconstruct edge-lit hologram 348. As shown, system 340 further comprises power source 352 and concave cylindrical lens 356. Power source 352 may include, for example, a battery or A/C transformer. Light source 354 may include, for example, one or more light emitting diodes (LEDs).

In operation, edge 350 of plinth 344 may be removably coupled to base enclosure 342. When plinth 344 is in place, light source 354 provides light to concave cylindrical lens 356 which in turn illuminates edge-lit hologram 348. Because edge 350 is preferably removably coupled to base enclosure 342, plinth 344 may be removed, and a second plinth 360 with a second edge-lit hologram 362 may be coupled to base enclosure 342. Further, system 340 may include a switch (not expressly shown) to activate and de-activate light source 356. The switch may be positioned such that light source 356 is activated whenever plinth 344 or 360 is coupled to base enclosure 342 and is deactivated when no plinth is installed.

Figure 17:
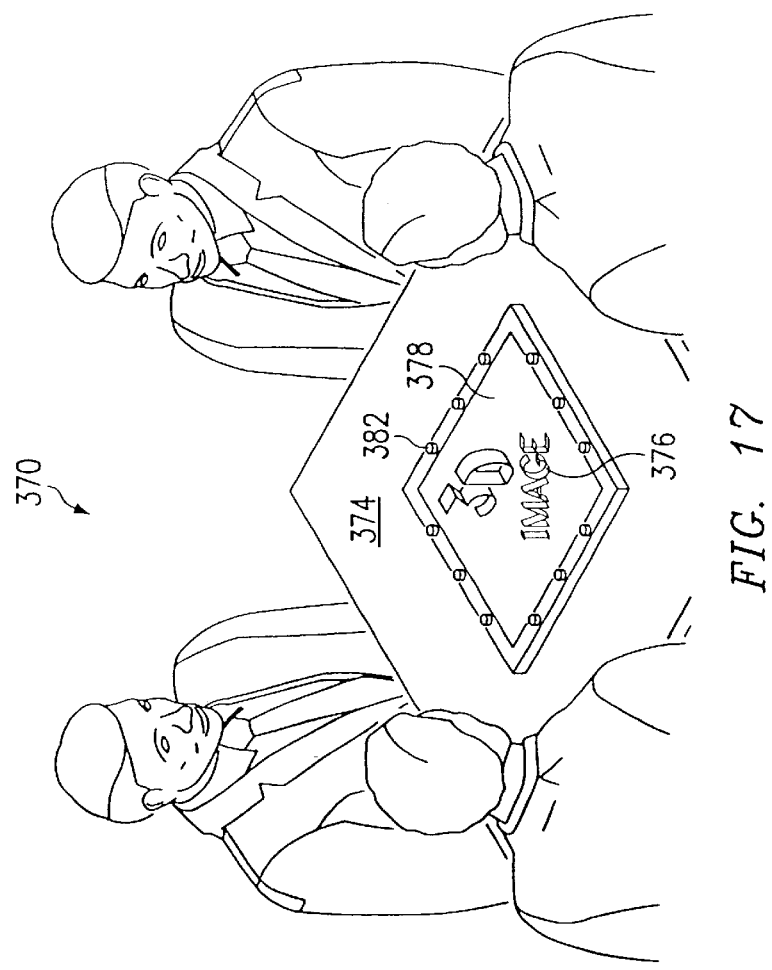
FIG. 17 is a schematic diagram of another embodiment of a system for displaying an interchangeable, interactive edge-lit hologram.

FIG. 17 is a diagram of another embodiment of a system, indicated generally at 370, for displaying an interchangeable edge-lit hologram. As shown, system 370 comprises a base enclosure 374, and a plinth 378 is removably coupled to base enclosure 374. An edge-lit hologram 376 is mounted to plinth 378. Multiple light sources (not expressly shown) may be positioned within base enclosure 374 and are preferably separately operable to illuminate edge-lit hologram 376. Further, a plurality of switches 382 may be coupled to base enclosure 374 to activate respective light sources. In addition, plinth 378 may be removed from base 374 and replaced.

In operation, multiple reference beams may be introduced to plinth 378. This allows for multiple edge-lit holograms 376 to be mounted onto plinth 378 and reconstructed with the multiple light sources. Alternatively, if the multiple images are viewed simultaneously, the reference beam intensities created by the light sources may be independently varied. In addition, a sound system may be installed into base enclosure 374 and be operable to interact with the images displayed as well as buttons 382. Alternatively, multiple plinths 378 may be stacked on top of each other, each illuminated by a separate light source. Further, base enclosure 374 may be operable to rotate plinth 378.

Figure 18:
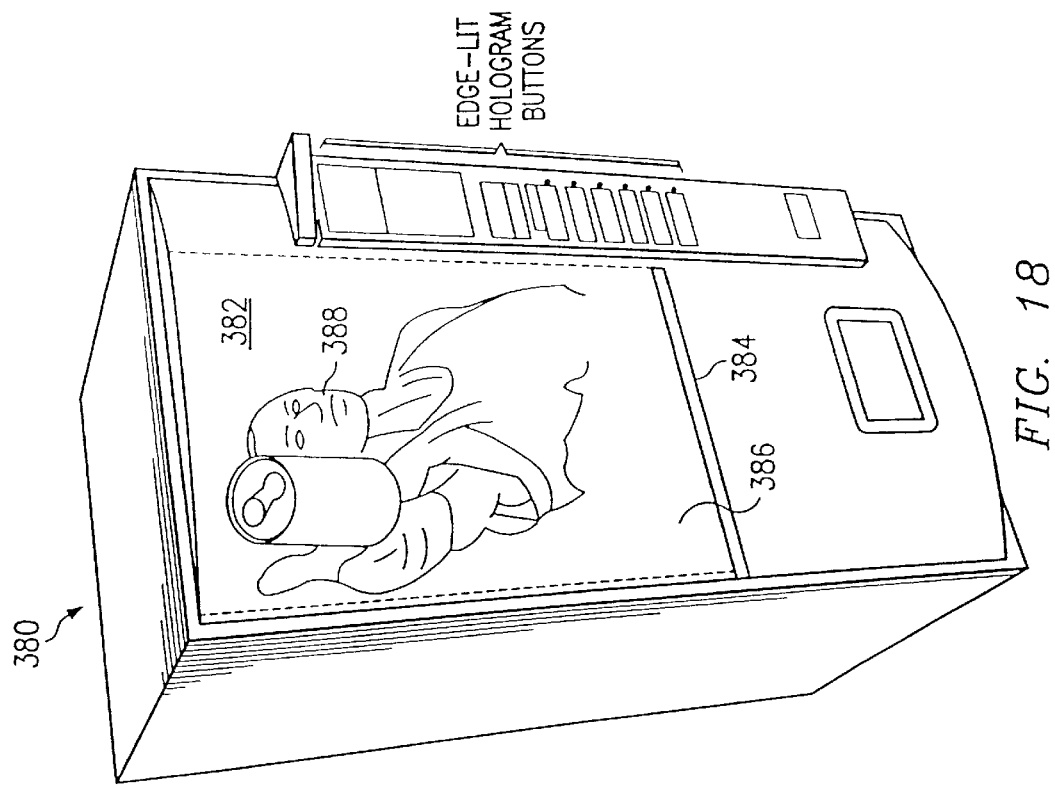
FIG. 18 is a schematic diagram of a further embodiment of a system for displaying an edge-lit hologram.

FIG. 18 is a diagram of a further embodiment of a system for displaying an edge-lit hologram. As can be seen, the system of FIG. 18 includes an automated vending machine 380 which includes a base enclosure 384. Plinth 386 may be releasably coupled or permanently fixed to base enclosure 384 by one edge of plinth 386. Alternatively, base enclosure 384 may be coupled to a plurality of edges of plinth 386. In the embodiment of FIG. 18, base enclosure 384 and plinth 386 may be attached, for example, to a front door 382 of automated vending machine 380. Further, an edge-lit hologram 388 can be mounted to plinth 386. Base enclosure 384 preferably includes a light source (not expressly shown) to illuminate and reconstruct hologram 358. Plinth 386 may be removably coupled to base enclosure 384 such that hologram 388 may be changed periodically by changing plinth 386.

Figure 19:
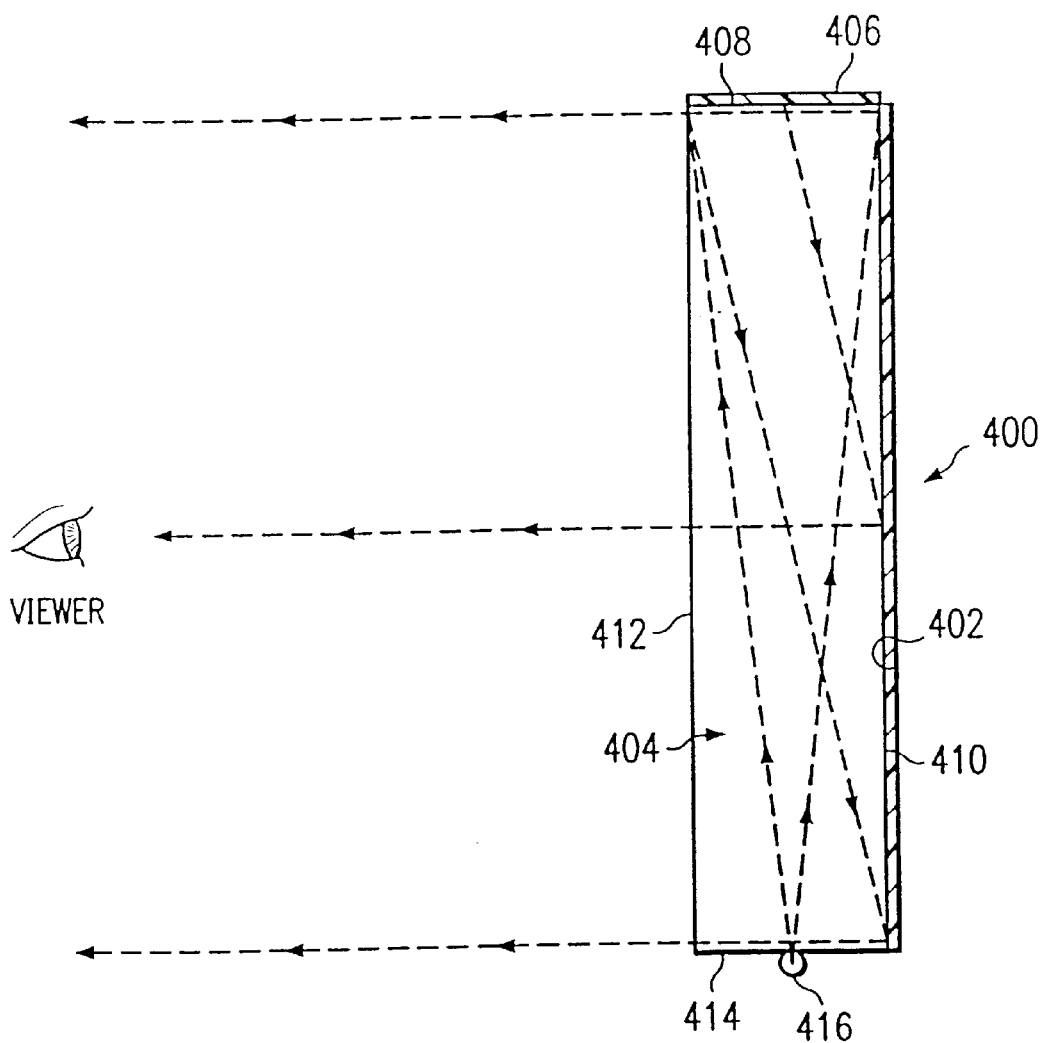
FIG. 19 is a schematic drawing in section with portions broken away of a system for displaying a monochrome edge-lit reflective hologram incorporating a collimating and reflecting holographic optical element in accordance with teachings of the present invention.

Portions of system 400 for displaying monochrome edge-lit reflection hologram 402 are shown in FIG. 19. Display system 400 includes plinth 404 having a generally rectangular box type configuration. Plinth 404 preferably includes first surface 410 and second surface 412 which are disposed generally parallel with-each other on opposite sides thereof. For the embodiment of the present invention represented by display system 400, first surface 410 and second surface 412 each have a generally rectangular configuration with approximately the same length and width. Plinth 404 also preferably includes first edge 408 and second edge 414 which are disposed on opposite. ends from each other and extending between first surface 410 and second surface 412. For the embodiment of the present invention represented by display system 400, first edge 408 and second 414 have generally rectangular configurations with approximately the same length and width.

Image hologram or reflection hologram 402 is preferably mounted on first surface or side 410 of plinth 404. Holographic optical element (HOE) 406 is preferably disposed along first edge 408 of plinth 404. HOE 406 may sometimes be referred to as a hologram lens or mirror.

Monochrome light source or illumination source 416 may be disposed adjacent to second edge 414 opposite from. HOE 406. HOE 406 is preferably formed to reflect and collimate monochrome light from illumination source 416. For some applications HOE 406 may be described as an off-axis collimating HOE for use with a monochrome light source. The dimensions of plinth 404 and HOE 406 and the location of illumination source 416 are preferably selected so that monochrome light from illumination source 416 striking HOE 406 will be collimated and reflected at the required angles to strike and illuminate image hologram 402. As a result, image hologram 402 will be visible to a viewer looking at second surface 412 of plinth 404.

HOE 406 and other HOE's, which will be described later in this written description, may be satisfactorily used to condition light beams which converge or diverge according to requirements of the specific image hologram that will be illuminated in accordance with teachings of the present invention. Collimated light beams are generally preferred for use as a reference beam when recording a hologram and when illuminating the resulting hologram.

Figure 20:
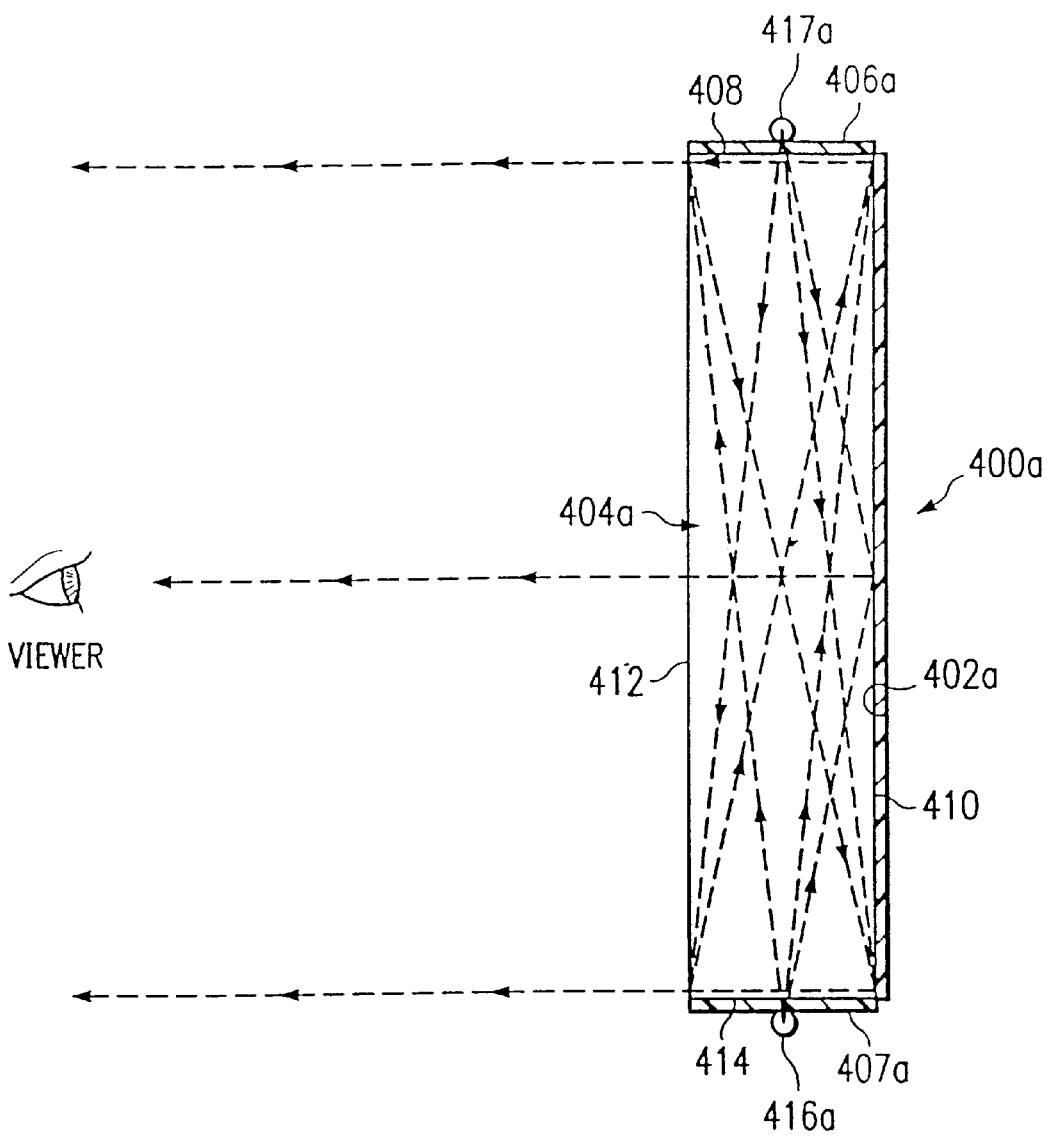
FIG. 20 is a schematic drawing in section with portions broken away of a system for displaying a two color edge-lit reflective hologram having two holographic optical elements and two illumination sources incorporating teachings of the present invention.

Portions of system 400*a* for displaying two color edge-lit reflection hologram 402*a* are shown in FIG. 20. Display system 400*a* preferably includes plinth 404*a* having a generally rectangular box-type configuration similar to previously described plinth 404. Image hologram 402*a* is preferably mounted on first surface or side 410 of plinth 404*a*. Plinth 404*a* also includes second surface 412 which is disposed generally parallel with first surface 410 on opposite sides of plinth 404*a*.

First holographic optical element (HOE) 406*a* is preferably disposed along first edge 408 of plinth 404*a*. Second holographic optical element (HOE) 407*a* is preferably disposed along second edge 414 of plinth 404*a*. First light source or illumination source 416*a* is preferably disposed adjacent to second HOE 407*a* opposite from second edge 414 of plinth 404*a*. In a similar manner second illumination source or light source 417*a* is preferably disposed adjacent to first HOE 406*a* opposite from first edge 408 of plinth 404*a*.

For those applications in which image hologram 402 is a horizontal parallax only (HPO) hologram first light source 416*a* and second light source 417*a* are preferably disposed approximately 180 degrees opposite from each other. For those applications in which image hologram 402*b* is a full parallax hologram, first light source 416*a* and second light source 417*a* may be disposed at an angle of approximately 90 degrees relative to each other (not expressly shown).

For purposes of describing various features of the present invention, first illumination source 416*a* will be referred to as a "green light source" and second illumination source 417*a* will be referred to as a "red light source." However, the present invention is not limited to use with only green and red illumination sources. Other colored illumination sources may be satisfactory use with the present invention depending upon characteristics of the associated reflection hologram which will be displayed.

First HOE 406*a* is preferably formed to reflect and collimate green light from first illumination force 416*a*. First HOE 406*a* may be generally described as an off-axis collimating HOE for use with a green light source. First HOE 406*b* is also preferably formed to be substantially transparent with respect to red light from second illumination source 417*a*. In a similar manner second HOE 407*a* is preferably formed to reflect and collimate red light from second illumination source 417*a* and to be substantially transparent with respect to green light from first illumination source 416*a*. Second HOE 406*a* may be generally described as an off-axis collimating HOE for use with a red light source.

The dimensions of plinth 404*a*, first HOE 406*a* and second HOE 407*a* and the location of respective illumination sources 416*a* and 417*a* are preferably selected in accordance with teachings of the present invention such that HOE 406*a* and 407*a* will collimate and reflect green light and red light from respective illumination sources 416*a* and 417*a* to strike reflection hologram 402*a* at the required angles to illuminate the associated two color hologram 402*b*.

Figure 21:
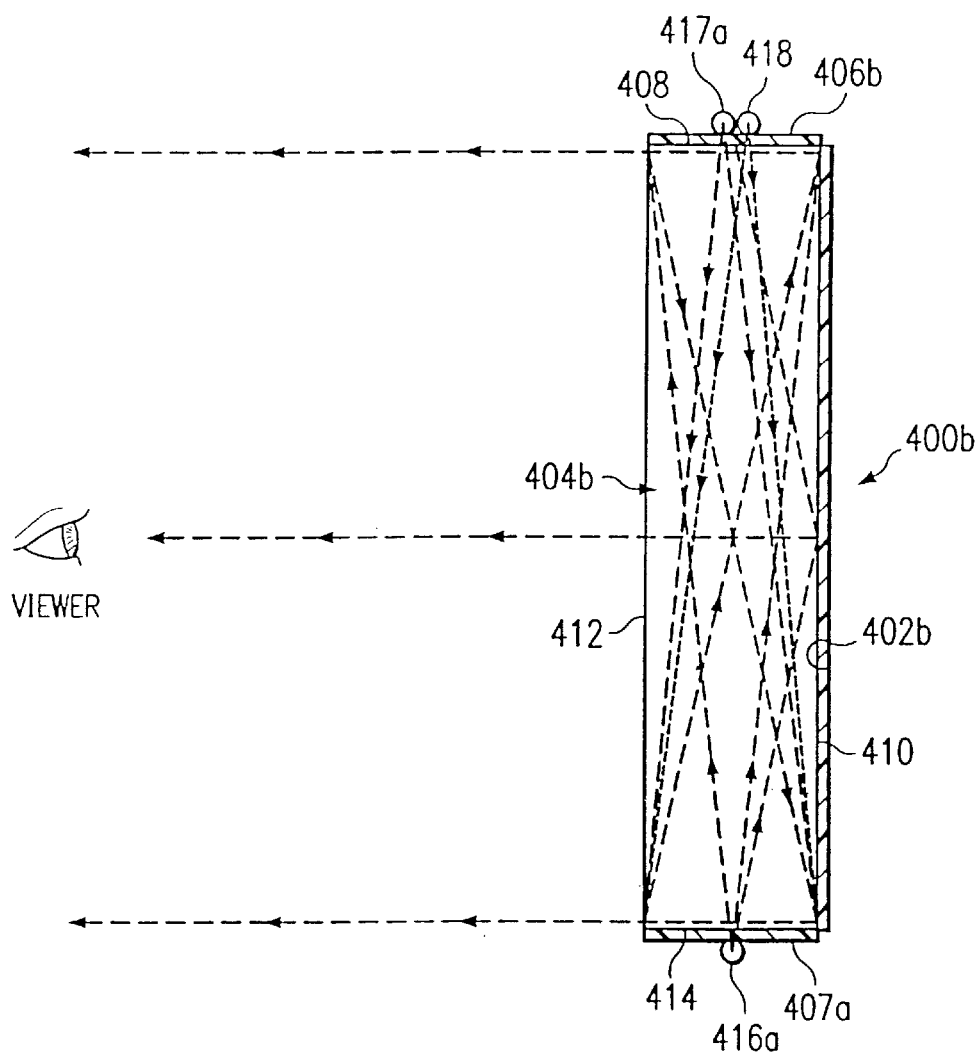
FIG. 21 is a schematic drawing in section with portions broken away showing a system for displaying a full color edge-lit reflective hologram having three holographic optical elements and three illumination sources incorporating teachings of the present invention.

Portions of system 400*b* for displaying full color edge-lit reflection hologram 402*b* are shown in FIG. 21. Display system 400*b* preferably includes plinth 404*b* having a generally rectangular box-type configuration. Plinth 404*b* may have substantially the same dimensions and configuration as previously described plinths 404 and 404*a*. Image hologram or reflection hologram 402*b* is preferably mounted on first surface or side 410 of plinth 404*b*.

First holographic optical element (HOE) 406*b* is preferably disposed along first edge 408 of plinth 404*b*. Second holographic optical element (HOE) 407*b* is preferably disposed along second edge 414 of plinth 404*b*. HOE 406*b* and HOE 407*a* may each be generally described as an off-axis collimating HOE. First light source or illumination source 416*a* is preferably disposed adjacent to second HOE 407*b* opposite from second edge 414 of plinth 404*b*. In a similar manner, second illumination source or light source 417*a* and third illumination source or light source 418 are preferably disposed adjacent to first HOE 406*b* opposite from first edge 408 of plinth 404*b*.

For purposes of describing various features of the present invention, first illumination source 416*a* will be referred to as a "green light source". Second illumination source 417*a* will be referred to as a "red light source". Third illumination source 418 will be referred to as a "blue light source". However, the present invention is not limited to use with only green, red and blue illumination sources. Other colored illumination sources may be satisfactorily used with the present invention depending upon characteristics of the associated reflection hologram which will be displayed.

First HOE 406*b* is preferably formed to reflect and collimate green light from first illumination source 416*a*. First HOE 406*b* is also preferably formed to be substantially transparent with respect to red light from second illumination source 417*a* and blue light from third Elimination source 418. In a similar manner, second HOE 407*b* is preferably formed to reflect and collimate red light from second illumination source 417*a* and blue light from third illumination source 418. Second HOE 407*b* is also preferably formed to be substantially transparent with respect to green light from first illumination source 416*a*. The dimensions of plinth 404*b*, first HOE 406*b*, and second HOE 407*b*, along with the location of respective illumination sources 416*a*, 417*a* and 418 are preferably selected in accordance with teachings of the present invention such that HOEs 406*b* and 407*b* will collimate and reflect green, red and blue light from respective illumination sources 416*a*, 417*a* and 418 to strike reflection hologram 402*b* at the required angle to illuminate the associated full color hologram.

For those applications in which image hologram 402*b* is a horizontal parallax only hologram, first light source 416*a* is preferably disposed approximately one hundred eighty degrees (180°) opposite from second light source 417a and third light source 418. For those applications in which image hologram 402b is a full parallax hologram, first light source 416a, second light source 417a and third light source 418 may be disposed at various angles relative to each other.

Holographic optical elements 406, 406a, 406b, 407, 407a and 407b are preferably formed from relatively thin, flat strips of material having the previously described optical characteristics. By combining holographic optical elements with illumination sources such as shown in FIGS. 19, 20 and 21, each holographic optical element will effectively fold or bend light from an associated illumination source to substantially reduce the required distance between the illumination source and. the associated edge-lit hologram. Previously available systems for displaying edge-lit holograms often required a plinth which was much larger than the associated image hologram. The increased size of such plinths was generally necessary to place the associated illumination source at an appropriate distance to allow light from the illumination source to strike the image hologram at required angles for illumination thereof.

For illustrating various features of the present invention, second light source 417a and third light source 418 are shown disposed adjacent to each other along first edge 408 of plinth 404b. Depending upon the characteristics and configuration of the associated plinth and the type of image hologram (full parallax or horizontal parallax only), a first illumination source and its associated HOE may be placed on a first pair of opposite edges. Second illumination source and its associated HOE may be placed on a second pair of opposite edges. Third illumination source and its associated HOE may be placed on a third pair of opposite edges.

Although the present invention has been described in detail, it should be understood that various changes, substitutions and alterations can be made thereto without departing from the spirit and scope of the invention as defined by the appended claims.

What is claimed is:

1. A system for displaying an edge-lit hologram comprising:

a plinth formed from material which allows transmission of light therethrough;

the plinth having a first surface and a second surface disposed generally parallel with each other;

the plinth having a first edge and a second edge disposed generally parallel with each other and extending between the first surface and the second surface;

an image hologram mounted on the first surface;

a first holographic optical element attached to and extending along the first edge;

a first source of illuminating light disposed on the second edge, the holographic optical element formed to collimate and reflect light from the illuminating source to strike the image hologram disposed on the first surface at appropriate angles to make the image hologram visible from the second surface of the plinth;

a second illuminating source of light disposed on the first edge of the plinth;

a second holographic optical element disposed on the second edge of the plinth;

the first holographic optical element formed from material which will collimate and reflect light from the first illuminating source and will be substantially transparent with respect to light from the second illuminating source; and the second holographic optical element formed from material which will generally collimate and reflect light from the second illuminating source and will be substantially transparent with respect to light from the first illuminating source.

2. A system for displaying an edge-lit hologram comprising:

a plinth formed from material which allows transmission of light therethrough;

the plinth having a first surface and a second surface disposed generally parallel with each other;

the plinth having a first edge and a second edge disposed generally parallel with each other and extending between the first surface and the second surface;

an image hologram mounted on the first surface;

a first holographic optical element attached to and extending along the first edge;

a first source of illuminating light disposed on the second edge, the holographic optical element formed to collimate and reflect light from the illuminating source to strike the image hologram disposed on the first surface at appropriate angles to make the image hologram visible from the second surface of the plinth;

a second illuminating source of light disposed on the first edge of the plinth;

a second holographic optical element disposed on the second edge of the plinth;

a third illuminating source of light disposed on the first edge of the plinth adjacent to the second illuminating source of light;

the first holographic element formed from material which will collimate and reflect light from the first illuminating source and will be substantially transparent with respect to light from the second illuminating source and the third illuminating source; and the second holographic element formed from material which will generally collimate and reflect light from the second illuminating source and the third illuminating source and will be substantially transparent with respect to light from the first illuminating source.

3. The display system of claim 65 further comprising:

the first illumination source providing green light;

the second illumination source providing red light; and the third illumination source providing blue light.

* * * * *